(12) United States Patent
Choi

(10) Patent No.: US 9,869,800 B2
(45) Date of Patent: Jan. 16, 2018

(54) PEAK HEIGHT FOR THE CALCULATION OF WIND LOAD CALCULATION APPARATUS AND METHOD

(71) Applicant: Kyungpook National University Industry-Academic Cooperation, Daegu (KR)

(72) Inventor: Se-Hyu Choi, Daegu (KR)

(73) Assignee: KYUNGPOOK NATIONAL UNIVERSITY INDUSTRY-ACADEMIC CO, Daegu (KR)

( * ) Notice: Subject to any disclaimer, the term of this patent is extended or adjusted under 35 U.S.C. 154(b) by 57 days.

(21) Appl. No.: 14/127,650

(22) PCT Filed: Dec. 18, 2013

(86) PCT No.: PCT/KR2013/011841
§ 371 (c)(1),
(2) Date: Jun. 3, 2014

(87) PCT Pub. No.: WO2014/115968
PCT Pub. Date: Jul. 31, 2014

(65) Prior Publication Data
US 2015/0369959 A1  Dec. 24, 2015

(30) Foreign Application Priority Data

Jan. 24, 2013  (KR) .................. 10-2013-0008179
Jan. 24, 2013  (KR) .................. 10-2013-0008183
(Continued)

(51) Int. Cl.
*G01B 21/00* (2006.01)
*G01W 1/02* (2006.01)
(Continued)

(52) U.S. Cl.
CPC ............... *G01W 1/02* (2013.01); *E04H 9/14* (2013.01); *E04H 9/16* (2013.01); *G01B 21/00* (2013.01)

(58) Field of Classification Search
CPC ............... G01W 1/02; E04H 9/14; E04H 9/16
See application file for complete search history.

(56) References Cited

U.S. PATENT DOCUMENTS

| 9,316,694 B2 * | 4/2016 | Campbell | G01R 31/3606 |
| 2012/0330588 A1 * | 12/2012 | Demar | H04Q 9/00 |
| | | | 702/63 |
| 2014/0107976 A1 * | 4/2014 | Kallfelz | H01M 10/4285 |
| | | | 702/182 |

FOREIGN PATENT DOCUMENTS

| JP | 2001143057 A | 5/2001 |
| KR | 10-0501071 B1 | 7/2005 |

(Continued)

OTHER PUBLICATIONS

International Preliminary Report on Patentability and Written Opinion issued in corresponding application No. PCT/KR2013/011841 dated Jul. 28, 2015.

(Continued)

*Primary Examiner* — Huan Tran
(74) *Attorney, Agent, or Firm* — Carter, DeLuca, Farrell & Schmidt, LLP

(57) ABSTRACT

Provided is a peak height estimating device and method for wind load computation. The peak height estimating device includes an information collecting unit collecting height information on a plurality of points in a subject area; and a peak height estimating unit performing statistical processing on the height information to estimate a peak height.

16 Claims, 21 Drawing Sheets

(30) Foreign Application Priority Data

| Feb. 25, 2013 | (KR) | 10-2013-0019915 |
| Dec. 16, 2013 | (KR) | 10-2013-0156553 |
| Dec. 16, 2013 | (KR) | 10-2013-0156555 |
| Dec. 16, 2013 | (KR) | 10-2013-0156558 |
| Dec. 16, 2013 | (KR) | 10-2013-0156560 |
| Dec. 16, 2013 | (KR) | 10-2013-0156562 |
| Dec. 16, 2013 | (KR) | 10-2013-0156563 |
| Dec. 16, 2013 | (KR) | 10-2013-0156564 |

(51) Int. Cl.
*E04H 9/14* (2006.01)
*E04H 9/16* (2006.01)

(56) References Cited

FOREIGN PATENT DOCUMENTS

| KR | 10-2010-0136604 A | 12/2010 |
| KR | 10-2011-0016523 A | 2/2011 |
| KR | 101055419 B1 | 8/2011 |
| KR | 101099484 B1 | 12/2011 |
| KR | 10-2013-0023142 B1 | 3/2013 |

OTHER PUBLICATIONS

Su Hyeon, 2nd Week Practice of Statistics, Soongsil University, Sep. 8, 2010.

Son Soo-hyoung, "Statistics and Exercise", Computer Architecture Laboratory Soongsil University, pp. 2-16, Sep. 8, 2010.

Min Ho Seong, et al., "Estimation of the Topographic Factor of Wind Speed Using GIS Information", Journal of Korea Spatial Information Society, vol. 19, No. 5, pp. 47-52 (2011).

* cited by examiner

PEAK HEIGHT FOR THE CALCULATION OF WIND LOAD CALCULATION APPARATUS AND METHOD

CROSS-REFERENCE TO RELATED APPLICATIONS

This U.S. non-provisional patent application claims priority under 35 U.S.C. §119 of Korean Patent Application Nos. 10-2013-0008179 filed on Jan. 24, 2013; 10-2013-0008183 filed on Jan. 24, 2013; 10-2013-0019915 filed on Feb. 25, 2013; 10-2013-0156553 filed on Dec. 16, 2013; 10-2013-0156555 filed on Dec. 16, 2013; 10-2013-0156558 filed on Dec. 16, 2013; 10-2013-0156560 filed on Dec. 16, 2013; 10-2013-0156562 filed on Dec. 16, 2013; 10-2013-0156563 filed on Dec. 16, 2013; and 10-2013-0156564 filed on Dec. 16, 2013, the entire contents of which are hereby incorporated by reference.

BACKGROUND OF THE INVENTION

The present invention disclosed herein relates to a peak height estimating device and method for calculating wind load.

In designing a structure, wind is one of factors to have to be fundamentally considered. The characteristics of the wind, such as speed and direction of the wind are strongly affected by surrounding topography, and when the speed of the wind increases by surrounding topography, it may threaten the safety of a structure. Thus, considering a change in wind speed according to surrounding topography and reflecting it to a design are needed.

In order to consider a change in wind speed due to topography, a topographic coefficient is introduced when estimating a design wind speed. The topographic coefficient is set to 1.0 for a region that does not affect the wind, such as plain, but is set to be larger than 1.0 for a region that changes a wind speed, such as a mountain, a hill, or a slope.

According to KBC2009, Korean Building Code announced by Ministry of Land, Transport, and Maritime Affairs of Korea in 2009, when estimating a topographic coefficient, the peak height H of a hill, a mountain, or a slope is used. However, the KBC2009 does not particularly suggest the definition of the peak height or how to find the peak height.

SUMMARY OF THE INVENTION

The present invention provides a peak height estimating device and method for more objectively and reasonably estimating a peak height used for calculating wind load.

Embodiments of the present invention provide devices for estimating a peak height used for computing wind load applied to a structure, the device including an information collecting unit collecting height information on a plurality of points in a subject area; and a peak height estimating unit performing statistical processing on the height information to estimate a peak height.

In some embodiments, the peak height estimating unit may be configured to: calculate a maximum value of the heights of the plurality of points, calculate a minimum value or mode of the heights of the plurality of points, and subtract the minimum value or the mode from the maximum value to estimate the peak height.

In other embodiments, the peak height estimating unit may be configured to: calculate a maximum value of the heights of the plurality of points, calculate a frequency distribution for the heights of the plurality of points, calculate the rank value of a rank having the maximum frequency on the frequency distribution or the mean value of heights belonging to the rank, and subtract the rank value or the mean value from the maximum value to estimate the peak height.

In still other embodiments, the peak height estimating unit may be configured to: calculate a maximum value of the heights of the plurality of points, calculate a frequency distribution for the heights of the plurality of points, calculate the rank value of a rank having the minimum frequency on the frequency distribution or the mean value of heights belonging to the rank, and subtract the rank value or the mean value from the maximum value to estimate the peak height.

In even other embodiments, the information collecting unit may further collect location information on a plurality of points in the subject area, and the peak height estimating unit uses regression analysis based on the location information and the height information to calculate a regression equation and uses the location information, the height information and the regression equation to estimate a peak height.

In yet other embodiments, the peak height estimating unit may be configured to calculate the regression equation based on location and height information on some of the plurality of points.

In further embodiments, the peak height estimating unit may be configured to calculate the regression equation based on location and height information on a predetermined number of points or a predetermined percentage of points among the plurality of points.

In still further embodiments, the peak height estimating unit may be configured to: calculate a frequency distribution for the heights of the plurality of points, select a point having a height belonging to a rank having the maximum or minimum frequency on the frequency distribution, and calculate the regression equation based on location and height information on the selected point.

In even further embodiments, the peak height estimating unit may be configured to set location information on said some points as an independent variable and height information on said some points as a dependent variable to calculate the regression equation.

In yet further embodiments, the peak height estimating unit may be configured to: select the highest of the plurality of points, and subtract a height obtained by applying location information on the highest point to the regression equation, from the height of the highest point to estimate the peak height.

In much further embodiments, the device may further include target area setting unit that uses the height information to set a target area different from the subject area, and wherein the peak height estimating unit may subtract the height of the ground surface of the subject area from the height of a peak of the target area to estimate the peak height.

In still much further embodiments, the target area setting unit may be configured to: set, as a first area, a circle-shaped area having, as a radius, a length obtained by multiplying the height difference between the highest point and the lowest point in the subject area by a preset value around the structure; or a circle-shaped area having, as a radius, a length obtained by multiplying the height difference between the highest point and the lowest point in the subject area by a preset value around the structure, and set, as the target area, a circle-shaped area having, as a radius, a length obtained by multiplying the height difference between the highest point in the first area and the lowest point in the subject area by a preset value around the structure.

In even much further embodiments, the information collecting unit may further collect location information on a plurality of points in the subject area, the peak height estimating device may further include a target area setting unit that uses the location information to set a target area different from the subject area, and the peak height estimating unit may subtract the height of the ground surface of the target area from the height of the peak of the target area to estimate the peak height.

In yet much further embodiments, the target area setting unit may be configured to: set, as a first area, a circle-shaped area having, as a radius, a length obtained by multiplying the horizontal distance between the highest point and the lowest point in the subject area by a preset value around the structure; or a circle-shaped area having, as a radius, a length obtained by multiplying the horizontal distance between the highest point and the lowest point in the subject area by a preset value around the structure, set, as the target area, a circle-shaped area having, as a radius, a length obtained by multiplying the horizontal distance between the highest point and the lowest point in the first area by a preset value around the structure.

In yet much further embodiments, the device may further include a target area setting unit that uses the height information to set a target area different from the subject area, and the peak height estimating unit may subtract the height of the ground surface located on a line passing through the peak of the target area and the structure, from the height of the peak of the target area to estimate the peak height.

In yet much further embodiments, the information collecting unit may further collect location information on a plurality of points in the subject area, and the peak height estimating device may further include a target area setting unit that uses the location information to set a target area different from the subject area, and the peak height estimating unit may subtract the height of the ground surface located on a line passing through the peak of the target area and the structure, from the height of the peak of the target area to estimate the peak height.

In yet much further embodiments, the peak height estimating unit may be configured to: determine the highest point in the target area as the peak, and determine, as the ground surface, the lowest point of a plurality of points located on a line passing through the highest point in the target area and the structure; a point having a height corresponding to the mode among a plurality of points located on a line passing through the highest point in the target area and the structure; a point having a height corresponding to the rank value of a rank having the maximum frequency on a frequency distribution for the heights of a plurality of points located on a line passing through the highest point in the target area and the structure; or a point having a height corresponding to the rank value of a rank having the minimum frequency on a frequency distribution for the heights of a plurality of points located on a line passing through the highest point in the target area and the structure.

In yet much further embodiments, the peak height estimating unit may be configured to: obtain height information on a plurality of points located on a line passing through the highest point in the target area and the structure by using interpolation based on at least one of a digital map including location and height information on a plurality of points in the subject area; and survey data obtained by surveying a plurality of points in the subject area, determine the highest point in the target area as the peak, and determine, as the ground surface, the lowest of a plurality of points located on the line.

In other embodiments of the present invention, methods of estimating a peak height used for computing wind load applied to a structure by using a peak height estimating device that includes an information collecting unit and a peak height estimating unit include collecting, by the information collecting unit, height information on a plurality of points in a subject area; and performing, by the peak height estimating unit, statistical processing on height information to estimate the peak height.

Still other embodiments of the present invention provide computer readable recording mediums on which a program to be executed by a computer and implement a peak height estimating method is recorded, the method including: collecting, by an information collecting unit, height information on a plurality of points in a subject area; and performing, by a peak height estimating unit, statistical processing on the height information to estimate the peak.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
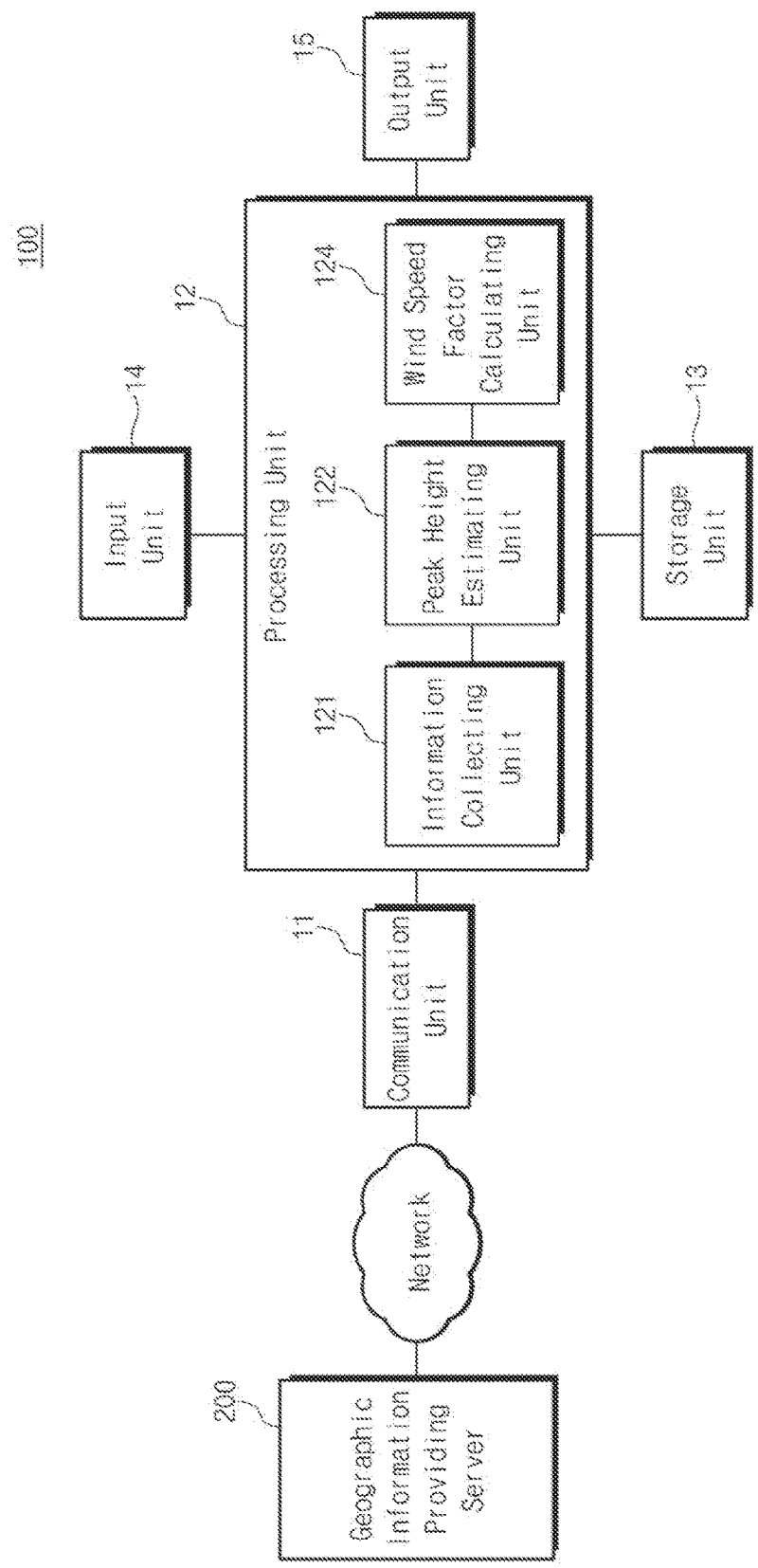
FIG. 1 is an exemplary block diagram of a peak height estimating device according to an embodiment of the present invention.

Other advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

When some terms are not defined, all the terms used herein (including technology or science terms) have the same meanings as those generally accepted by typical technologies in the related art to which the present invention pertains. The terms defined in general dictionaries may be construed as having the same meanings as those used in the disclosure and/or the related art and even when some terms are not clearly defined, they should not be construed as being conceptual or excessively formal.

The terms used herein are only for explaining specific embodiments while not limiting the present invention. The terms of a singular form may include plural forms unless referred to the contrary. The terms used herein "includes", "comprises", "including" and/or "comprising" do not exclude the presence or addition of one or more compositions, ingredients, components, steps, operations and/or elements other than the compositions, ingredients, components, steps, operations and/or elements that are mentioned. In the disclosure, the term "and/or" indicates each of enumerated components or various combinations thereof.

On the other hand, the term "unit", "group", "block", or "module" used herein may mean a unit for processing at least one function or operation. For example, it may mean software or a hardware component such as FPGA or ASIC. However, the term "unit", "group", "block" or "module" is not limited to the software or the hardware. The term "unit", "group", "block" or "module" may be configured in an addressable storage medium or may be configured to operate one or more processors.

Thus, as an example, the "unit", "group", "block" or "module" includes components such as software components, object-oriented software components, class components, and task components, processes, functions, attributes, procedures, sub routines, program code segments, drivers, firmware, micro codes, circuits, data, DBs, data structures, tables, arrays and variables. Components and functions provided in the "unit", "group", "block" or "module" may be integrated as a smaller number of components and a smaller number of units, blocks, or modules or may be further divided into further components and further units, groups, or modules.

Various embodiments of the present invention are described below in detail with reference to the accompanying drawings.

The term "structure" used herein covers a building, fittings, an outdoor advertisement, and a bridge and means all articles that are arranged on the space and bear load due to wind.

Embodiments of the present invention present a device and method for estimating a peak height used for calculating wind load applied to a structure.

The peak height estimating device and method according to an embodiment of the present invention may collect height information on a plurality of points in a subject area and perform statistical processing on the height information to estimate the peak height of the subject area objectively and reasonably.

FIG. 1 is an exemplary block diagram of a peak height estimating device 100 according to an embodiment of the present invention.

As shown in FIG. 1, the peak height estimating device 100 may include an information collecting unit 121 and a peak height estimating unit 122. The information collecting unit 121 may collect height information on a plurality of points in a subject area. The peak height estimating unit 122 may perform statistical processing on the height information to estimate a peak height.

According to an embodiment of the present invention, the peak height estimating device 100 may further include a storage unit 13. The storage unit 13 may store geographical information on the subject area. For example, the storage unit 13 may store at least one of a digital map of the subject area, a digital elevation model (DEM) of the subject area, and survey data obtained by surveying the subject area. The survey data may be data obtained by using at least one of ground survey, GPS survey, aerial photogrammetry, radar survey, and LiDAR survey but a survey method for obtaining the survey data is not limited thereto.

According to an embodiment, the information collecting unit 121 may read height information from the storage unit 13 and collect height information on a plurality of points in the subject area.

According to another embodiment of the present invention, the peak height estimating device 100 may further include a communication unit 11. The communication unit 11 may connect to a server providing geographical information on the subject area.

For example, as shown in FIG. 1, the communication unit 11 may connect to a server 200 providing geographical information, such as a geographic information system (GIS) through a wired or wireless network, and the information collecting unit 121 may collect height information on the subject area from the server 200.

The geographical information on the subject area provided by the server 200 may include at least one of a digital map of the subject area, a digital elevation model (DEM) of the subject area, and survey data obtained by surveying the subject area. The survey data may be data obtained by using at least one of ground survey, GPS survey, aerial photogrammetry, radar survey, and LiDAR survey but a survey method for obtaining the survey data is not limited thereto.

Figure 2:
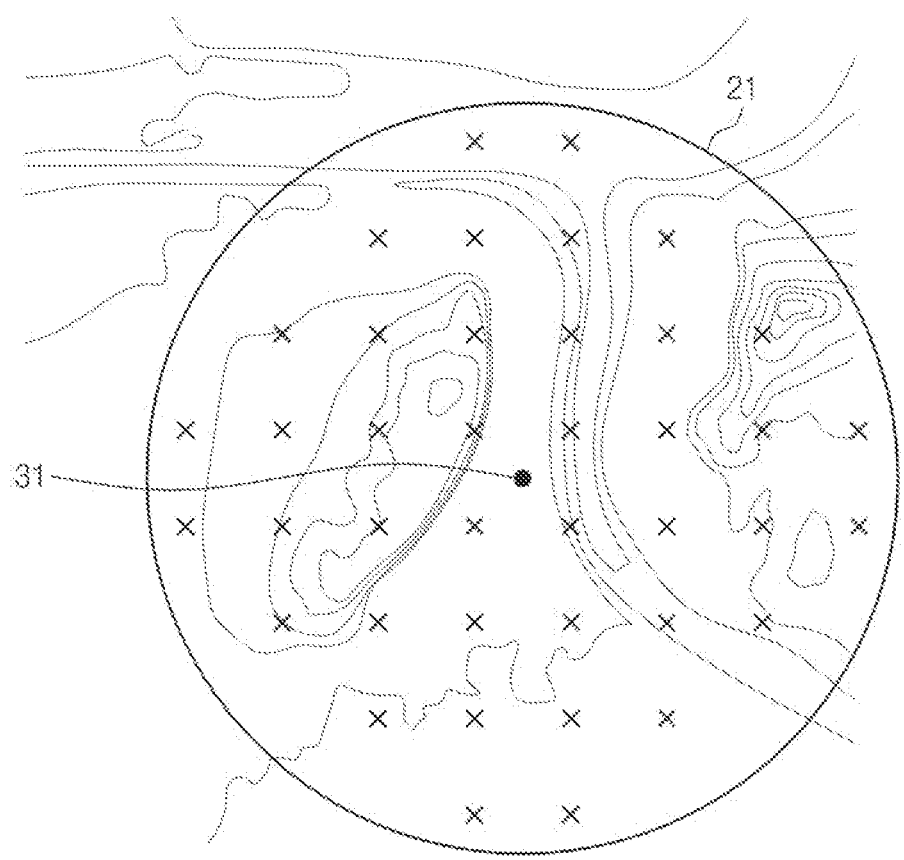
FIG. 2 is an example of a subject area for estimating a peak height according to an embodiment of the present invention.

FIG. 2 is an example of a subject area for estimating a peak height according to an embodiment of the present invention.

As shown in FIG. 2, the subject area 21 may be a circle-shaped area having a certain radius around a predetermined point. According to an embodiment, the subject area 21 may be a circle-shaped area that has a radius, a small one of forty times the height of a structure 31 and 3 km from the structure 31, but the shape and size of the subject area is not limited thereto and may have any shape or size. For example, the subject area may also be a polygonal area or a sectorial area.

In some embodiments, it is possible to set, as a first area 21, an area having a preset shape and size around the structure 31 and may set, and set, as a subject area, a circle-shaped area having, as a radius, a length obtained by multiplying a difference between the highest point and the lowest point in the first area 21 by a preset value around the structure 31.

In this example, the value multiplied in order to determine a radius of the subject area may be 1.6 but is not limited thereto.

According to an embodiment of the present invention, the information collecting unit 121 may allocate a plurality of points x to the subject area 21 at constant intervals, and collect height information on the allocated points x. In other words, as shown in FIG. 2, the points x may be allocated to be uniformly distributed in the subject area 21.

Figure 3:
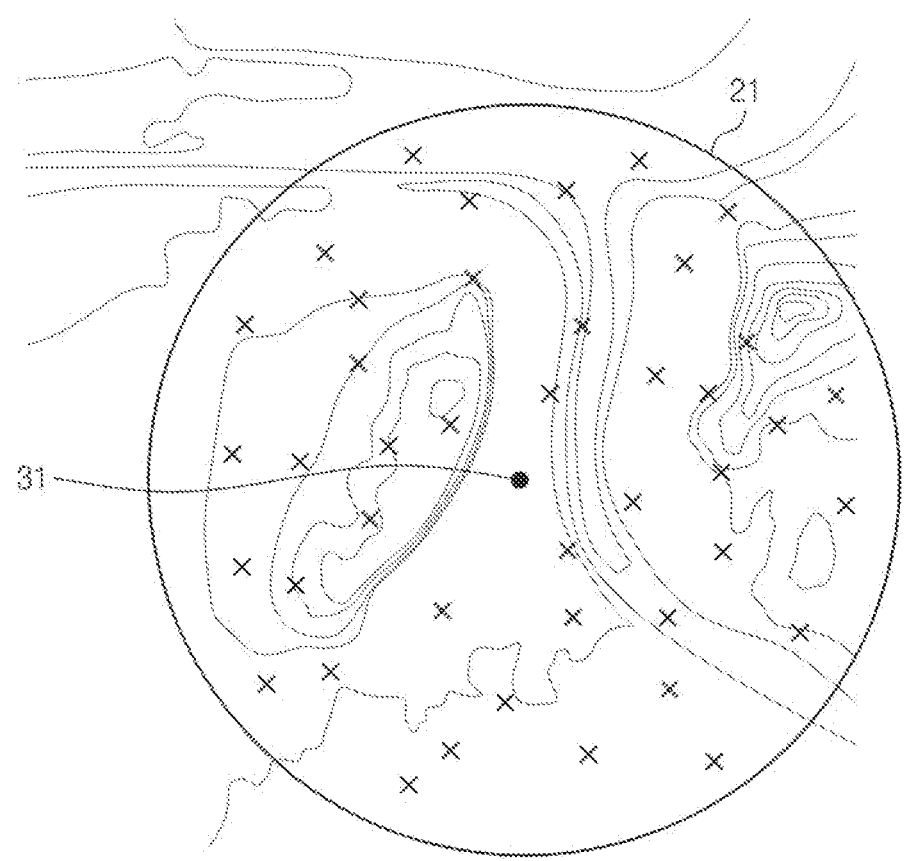
FIG. 3 is another example of a subject area for estimating a peak height according to an embodiment of the present invention.

However, as shown in FIG. 3, the points x may be non-uniformly distributed in the subject area 21.

Figure 4:
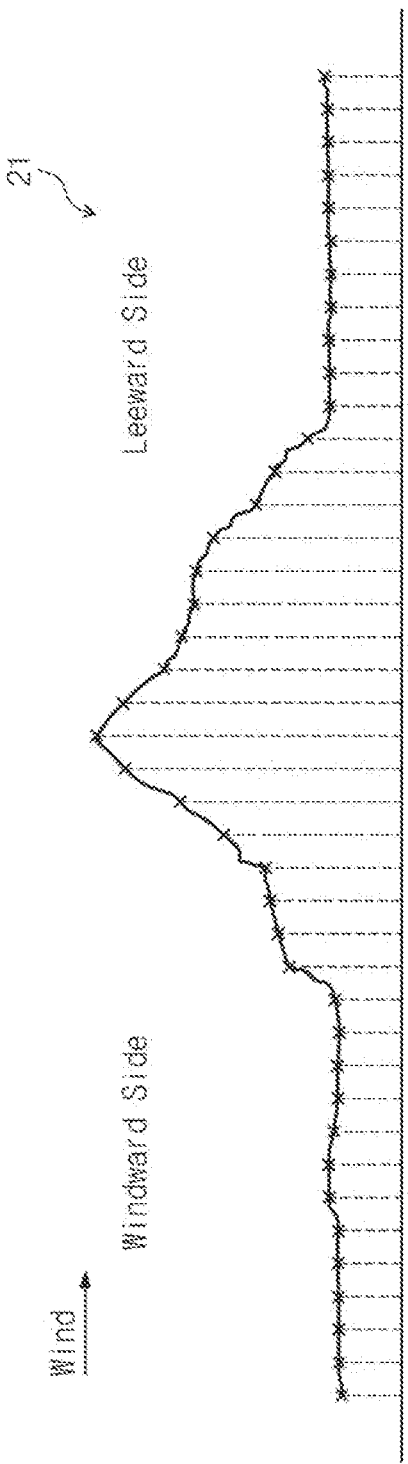
FIG. 4 is another example of a subject area for estimating a peak height according to an embodiment of the present invention.

FIG. 4 is another example of a subject area for estimating a peak height according to an embodiment of the present invention.

As shown in FIG. 4, the subject area 21 to which a plurality of pints are allocated and from which height information is collected may also be the slopes of a windward side and a leeward side. The information collecting unit 121 may allocate a plurality of points x to the slopes of the windward side and leeward side at certain intervals, and collect height information on the allocated points x.

According to an embodiment of the present invention, the peak height estimating device 100 may further include an input unit 14. The input unit 14 may obtain data setting the subject area 21 from a user that uses the peak height estimating device 100.

For example, in order to set the subject area 21 shown in FIG. 2, a user may input data designating the location of the structure 31 through the input unit 14, e.g., the latitude and longitude data of the structure 31 and input the height of the structure 31.

Then, the information collecting unit 121 may set a circle-shaped subject area that has, as a radius, a small one of forty times the height of the structure 31 and 3 km from the structure 31 around the location of the structure 31, but the shape or size of the subject area is not limited thereto.

In some embodiments, the shape or size of the subject area may be input by a user through the input unit 14.

Moreover, data designating the location of the structure is not limited to latitude and longitude data and may include GPS data and a lot number on the structure.

The peak height estimating unit 122 may perform statistical processing on the collected height information to estimate a peak height.

According to an embodiment, the peak height estimating unit 122 may determine a maximum value of the collected heights of a plurality of points as the height of a point corresponding to a peak and calculate a minimum value or a mode as the height of a point corresponding to the ground surface to estimate a peak height.

For example, the peak height estimating unit 122 may calculate a maximum value of the heights of the points, calculate a minimum value of a mode of the heights of the points, and subtract the minimum value or the mode from the maximum value to estimate a peak height.

Figure 5:
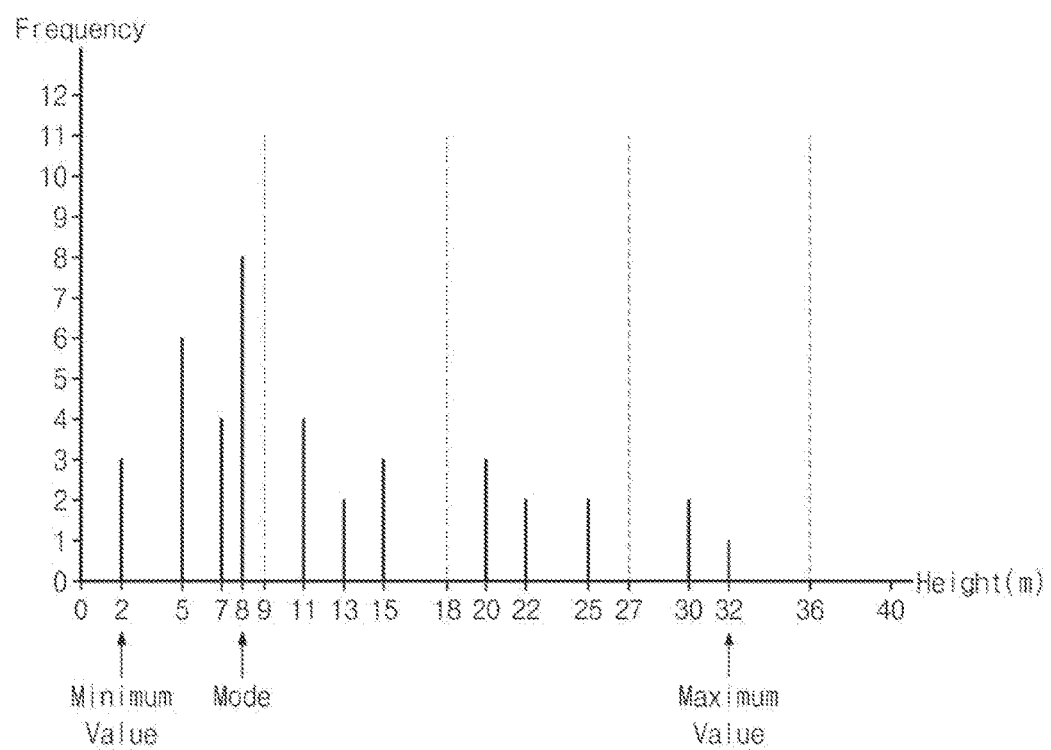
FIG. 5 is a graph of a plurality of points in a subject area according to an embodiment of the present invention, the points being represented in height order.

FIG. 5 is a graph of a plurality of points x in the subject area 31 according to an embodiment of the present invention, the points being represented in height order.

According to an embodiment shown in FIG. 5, the maximum value of the heights of a plurality of points x collected from the subject area 21 is 32 m, the minimum value thereof is 2 m, and the mode thereof is 8 m. According to an embodiment, the peak height estimating unit 122 may determine 30 m obtained by subtracting a minimum value of 2 m from a maximum value of 32 m, as the peak height. According to another embodiment, the peak height estimating unit 122 may also determine 24 m obtained by subtracting a mode of 8 m from a maximum value of 32 m, as the peak height.

According to another embodiment of the present invention, the peak height estimating unit 122 may calculate a frequency distribution of a plurality of points x collected from the subject area 21 and estimate a peak height based on the calculated frequency distribution.

According to the present embodiment, the peak height estimating unit 122 may calculate a maximum value of the heights of the points, calculate a frequency distribution of the heights of the points, calculate the rank value of a rank having the maximum frequency on the frequency distribution, and subtract the rank value from the maximum value to estimate a peak height.

Figure 6:
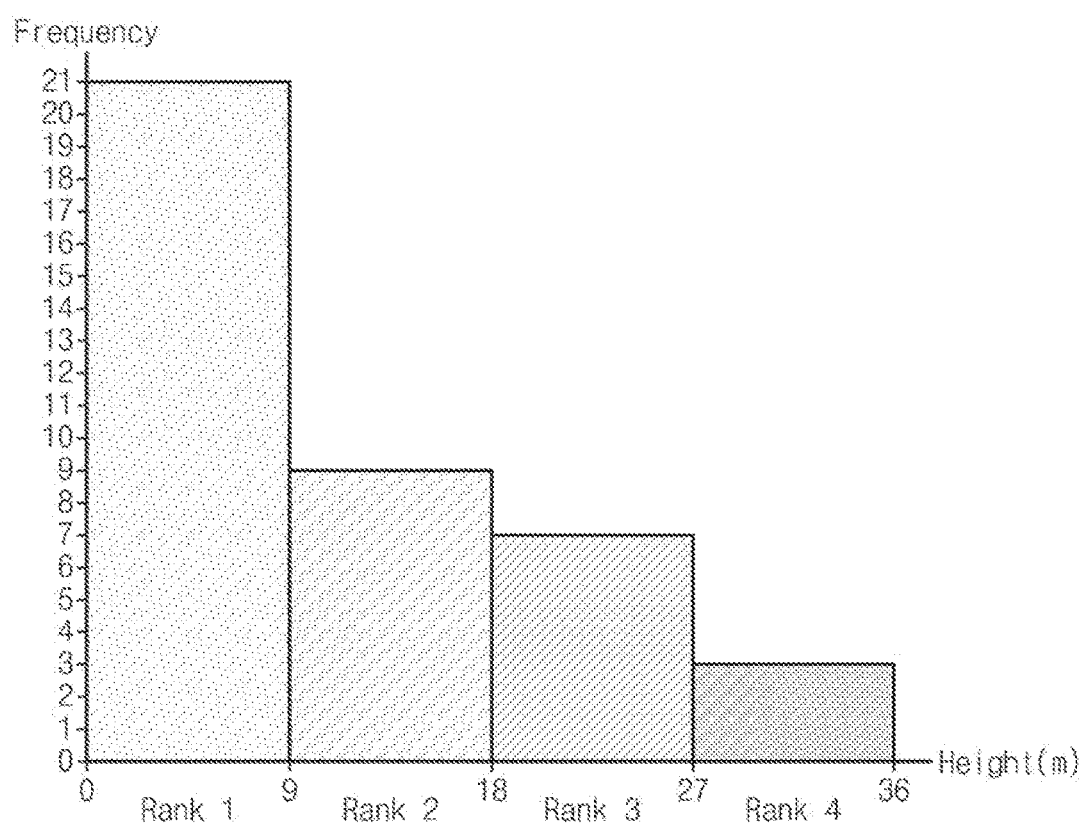
FIG. 6 is a frequency distribution graph representing frequency distribution of the heights of a plurality of points in a subject area produced according to an embodiment of the present invention.

FIG. 6 is a frequency distribution graph representing frequency distribution of the heights of a plurality of points x in the subject area 21 produced according to an embodiment of the present invention.

The frequency distribution graph shown in FIG. 6 represents height information collected as in FIG. 5, as ranks each of which has nine sizes. A rank having the maximum frequency on the frequency distribution shown in FIG. 6 is rank 1, and the rank value of rank 1 may be 4.5 m that is a median of the rank. According to the present embodiment, the peak height estimating unit 122 may estimate 27.5 m obtained by subtracting the rank value 4.5 m of rank 1 from a maximum value of 32 m, as a peak height.

According to another embodiment, the peak height estimating unit 122 may calculate a maximum value of the heights of the points, calculate frequency distribution of the heights of the points, calculate the average value of heights belonging to a rank having the maximum frequency on the frequency distribution, and subtract the mean value from the maximum value to estimate a peak height.

In this example, the mean value may be one of the arithmetic mean, the geometric mean, and the harmonic mean. When the peak height estimating unit 122 calculates the arithmetic mean of heights and estimates a peak height, the arithmetic mean of heights 2 m, 5 m, and 8 m belonging to rank 1 that is a rank having the maximum frequency on the frequency distribution shown in FIG. 6 may be calculated as 22/4=5.5 m. The peak height estimating unit 122 may estimate, as a peak height, 26.5 m obtained by subtracting the arithmetic mean 5.5 of heights belonging to rank 1, from a maximum value of 32 m.

According to another embodiment, the mean value may be a weighted average value obtained by applying frequency as a weighted value to a height. According to the present embodiment, the peak height estimating unit 122 may calculate a maximum value of the heights of the points, calculate frequency distribution of the heights of the points, apply a frequency of a corresponding height as a weighted value to heights belonging to a rank having the maximum frequency on the frequency distribution to calculate a weighted average value, and subtract the weighted average value from the maximum value to estimate a peak height.

For example, when a frequency of a corresponding height is applied as a weighted value to heights 2 m, 5 m, 7 m, and 8 m belonging to rank 1 that is a rank having the maximum frequency on the frequency distribution shown in FIG. 6 to find a weighted average value, $((2\times3)+(5\times6)+(7\times4)+(8\times8))/21\approx6.1$ m may be calculated. The peak height estimating unit 122 may estimate, as a peak height, 25.9 m obtained by subtracting the weighted average value 6.1 m of heights belonging to rank 1, from a maximum value of 32 m.

According to another embodiment of the present invention, instead of estimating a peak height based on a rank having the maximum frequency on a frequency distribution as described above, the peak height estimating unit 122 may also estimate a peak height based on a rank having the minimum frequency on a frequency distribution.

For example, the peak height estimating unit 122 may calculate a maximum value of the heights of the points, calculate a frequency distribution of the heights of the points, calculate the rank value of a rank having the minimum frequency on the frequency distribution, and subtract the rank value from the maximum value to estimate a peak height.

A rank having the minimum frequency on the frequency distribution shown in FIG. 6 is rank 1, and the rank value of rank 1 may be 4.5 m that is a median of the rank as described above. In this case, the peak height estimating unit 122 may estimate, as a peak height, 27.5 m obtained by subtracting the rank value 4.5 m of rank 1 from a maximum value of 32 m.

According to another embodiment, the peak height estimating unit 122 may calculate the mean value of heights belonging to a rank having the minimum frequency on a frequency distribution, and subtract the mean value from the maximum value of the heights to estimate a peak height. In this example, the mean value may be one of the arithmetic mean, the geometric mean, and the harmonic mean, and may also be a weighted average value obtained by applying a frequency of a height as a weighted value.

According to another embodiment of the present invention, the information collecting unit 121 may further collect location information on a plurality of points in the subject area 21. In addition, the peak height estimating unit 122 may use regression analysis based on location information and height information on a point to calculate a regression equation and may use the location information, the height information, and the regression equation to estimate a peak height.

According to the present embodiment, the peak height estimating unit 122 may calculate the regression equation based on location information and height information on some of a plurality of points. In other words, the peak height estimating unit 122 may perform regression analysis only on some of the points.

According to an embodiment, the peak height estimating unit 122 may calculate a regression equation based on location and height information on a predetermined number of points or a predetermined percentage of points among the plurality of points. In some embodiments, a user may also input the number of points or the percentage of points used for regression analysis through the input unit 13.

According to another embodiment, the peak height estimating unit 122 may use a frequency distribution to select a point to be used for regression analysis among the points.

For example, the peak height estimating unit 122 may calculate a frequency distribution of the heights of the points, select a point having a height belonging to a rank having the maximum frequency from the frequency distribution, and calculate a regression equation based on location and height information on the selected point.

As an example, referring to FIG. 6, the peak height estimating unit 122 may select, from the points, a point having a height belonging to rank 1 that is a rank having the maximum frequency. Then, the peak height estimating unit 122 may calculate a regression equation based on location and height information on the selected point.

As another example, the peak height calculating unit 122 may select a point having a height belonging to a rank having the minimum frequency on a frequency distribution and calculate a regression equation based on location and height information on the selected point.

The peak height estimating unit 122 may set location information on the selected point as an independent variable and height information as a dependent variable to calculate a regression equation.

Figure 7:
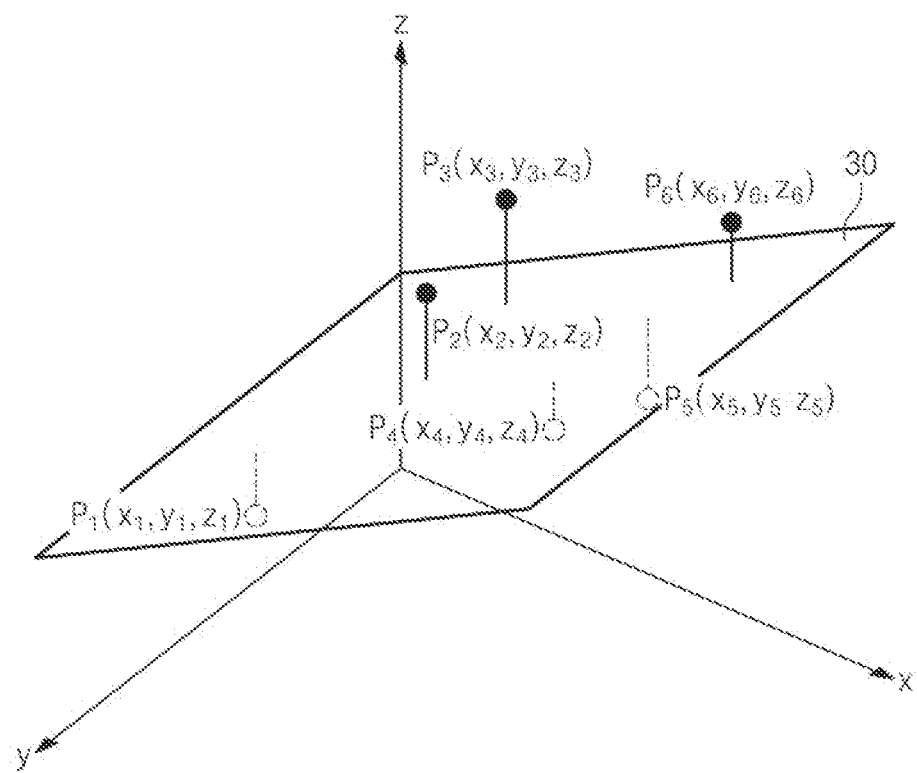
FIG. 7 is a diagram for explaining a process of producing a regression equation based on location and height information on a plurality of points according to an embodiment of the present invention.

FIG. 7 is a diagram for explaining a process of calculating a regression equation based on location and height information on a selected point according to an embodiment of the present invention.

As shown in FIG. 7, according to an embodiment of the present invention, the peak height estimating unit 122 may perform regression analysis on location and height information (x, y, z) on selected points ($P_1$ to $P_6$) and calculate the following regression equation.

$$Z_i = a_0 + a_1 x_i + a_2 y_i + e_i$$

The regression equation may be one representing a plane 30 shown in FIG. 7.

According to an embodiment, the peak height estimating unit 122 may calculate $a_0$, $a_1$, and $a_2$ that minimize the sum of the square of an error $e_i$ as below.

$$S_r = \sum_{i=1}^{n} (z_i - a_0 - a_1 x_i - a_2 y_i)^2$$

To that end, the peak height calculating unit 140 may perform partial differentiation on $S_r$ by using each of unknown quantities $a_0$, $a_1$ and $a_2$ to find simultaneous equations as below:

$$\frac{\partial S_r}{\partial a_0} = -2\sum (z_i - a_0 - a_1 x_i - a_2 y_i) = 0$$

$$\frac{\partial S_r}{\partial a_1} = -2\sum x_i(z_i - a_0 - a_1 x_i - a_2 y_i) = 0$$

$$\frac{\partial S_r}{\partial a_2} = -2\sum y_i(z_i - a_0 - a_1 x_i - a_2 y_i) = 0$$

Then, it is possible to calculate $a_0$, $a_1$, and $a_2$ by finding the solutions of the simultaneous equations.

As an example, when location and height information x, y, and z on points $P_1$ to $P_6$ is provided as $P_1$ (0, 0, 5), $P_2$ (2, 1, 10), $P_3$ (2.5, 2, 9), $P_4$ (1, 3, 0), $P_5$ (4, 6, 3), and $P_6$ (7, 2, 27), then $a_0$=5, $a_1$=4, and $a_2$=−3.

Thus, a planar equation obtained by performing regression analysis on the points $P_1$ to $P_6$ is as follows:

$$z=5+4x-3y.$$

As such, the ground surface height calculating unit 140 may set location information x and y on some points $P_1$ to $P_6$ selected from a plurality of points as an independent variable and height information z as a dependent variable to calculate a regression equation.

The peak height estimating unit 122 may use the calculated regression equation and location and height information on a plurality of points collected by the information collecting unit 121 to estimate a peak height.

According to an embodiment of the present invention, the peak height estimating unit 122 may select the highest point from a plurality of points, apply location information on the highest point to the regression equation to find the height of the ground surface, and subtract the height of the ground surface from the height of the highest point to estimate a peak height.

Figure 8:
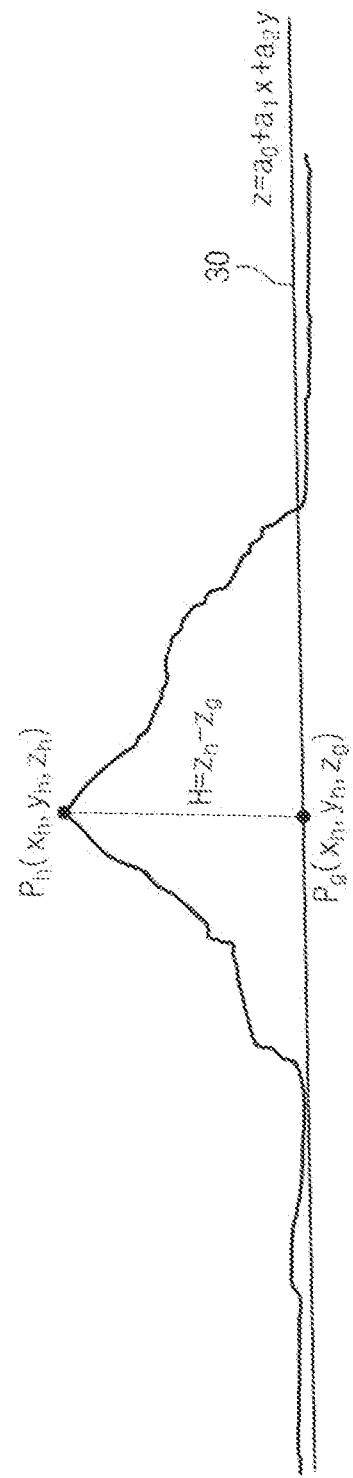
FIG. 8 is a diagram for explaining a process of estimating a peak height by using a regression equation according to an embodiment of the present invention.

FIG. 8 is a diagram for explaining a process of estimating a peak height by using a regression equation according to an embodiment of the present invention.

Referring to FIG. 8, the peak height estimating unit 122 may select the highest point $P_h$ among the points on which location and height information have been collected by the information collecting unit 121. Then, the peak height estimating unit 122 may apply location information $x_h$, $y_h$ on the highest point $P_h$ to a regression equation to compute a height $z_g$ of the ground surface. Then, the peak height estimating unit 122 may subtract the height $z_g$ of the ground surface from the height $z_h$ of the highest point to estimate a peak height H.

Figure 9:
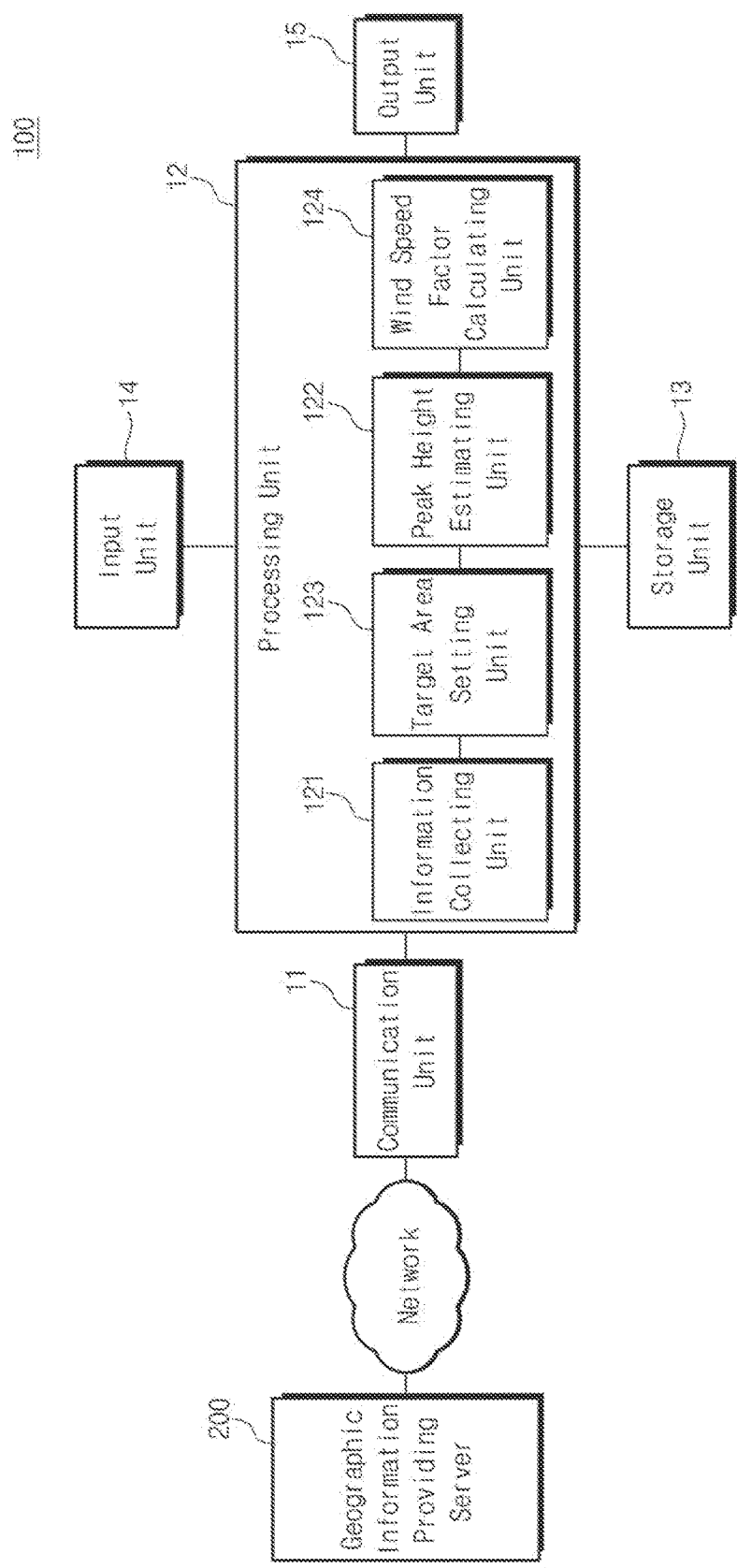
FIG. 9 is an exemplary block diagram of a peak height estimating device according to another embodiment of the present invention.

FIG. 9 is an exemplary block diagram of a peak height estimating device 100 according to another embodiment of the present invention.

As shown in FIG. 9, according to another embodiment of the present invention, the device may further include a target area setting unit 123 that uses height information on a point in the subject area 21 to set an target area different from the subject area 21. According to the present embodiment, the peak height estimating unit 122 may subtract the height of the ground surface of the subject area 21 from the peak height of the target area to estimate a peak height.

Figure 10:
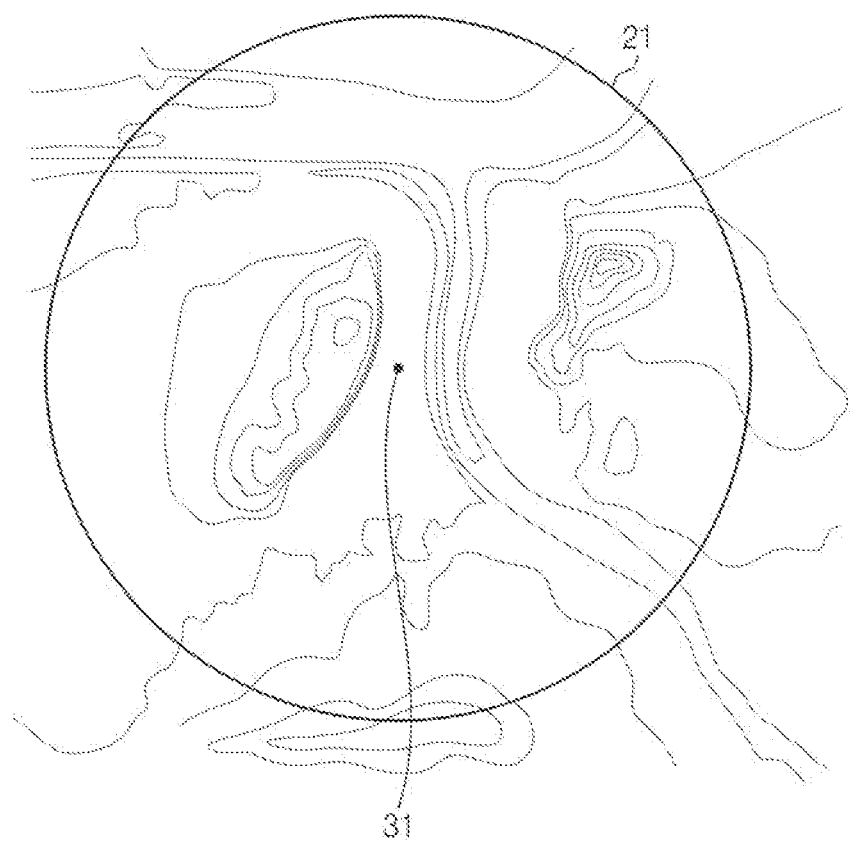
FIG. 10 is an example of a subject area set for calculating wind load according to an embodiment of the present invention.

FIG. 10 is an example of a subject area set for calculating wind load according to an embodiment of the present invention.

According to an embodiment, the information collecting unit 121 may set, as the subject area, an area having a preset shape and size around a structure.

For example, as shown in FIG. 10, the information collecting unit 121 may set, as the subject area, a circle-shaped area 21 having a preset size around a structure 31. In the present embodiment, although the subject area 21 is set in a circle shape, the shape of the subject area is not limited thereto and may be set as any shape such as a polygon, an ellipse or a sector.

According to an embodiment, the information collecting unit 121 may set, as the subject area, a circle-shaped area 21 having, as a radius, a small one of forty times the height of the structure and 3 km from the structure around the structure 31. However, the size of the subject area is not limited thereto and may be set to various values depending on the embodiment.

Then, the information collecting unit 121 may collect height information on a plurality of points in the subject area 21 set in the above method.

According to an embodiment, the information collecting unit 121 may obtain height information on a point from at least one of a digital map including height information on the plurality of points and survey data obtained by surveying the plurality of points. The survey data may be data obtained by using at least one of ground survey, GPS survey, aerial photogrammetry, radar survey, and LiDAR survey but a survey method for obtaining the survey data is not limited thereto.

According to an embodiment, the peak height estimating device 100 may further include a storage unit 12. The storage unit 12 may store height information on the plurality of points. In this case, the information collecting unit 121 may read height information from the storage unit 121 and obtain height information on the plurality of points.

According to another embodiment of the present invention, the peak height estimating unit 100 may further include a communication unit 10.

The communication unit 10 may connect to a server providing geographical information on the plurality of points.

For example, as shown in FIG. 1, the communication unit 10 may connect to a server 200 providing geographical information, such as a geographic information system (GIS) through a wired or wireless network, and the information collecting unit 121 may collect height information on the plurality of points from the server 200.

In some cases, the peak height estimating unit 100 may further include an input unit 13 and obtain height information on the plurality of points from a user through the input unit 13.

According to an embodiment, the information collecting unit 121 may obtain height information from an elevation point of a digital map, a panel point extracted from a contour line, or both of them but a point in the subject area 21 from which height information is obtained is not limited to the elevation point and the panel point.

As described above, the information collecting unit 121 may obtain height information on the plurality of points from at least one of a digital map and survey data but may also obtain heights on the plurality of points by using interpolation based on at least one of the digital map and the survey data depending on the embodiment.

In some embodiments, the information collecting unit 121 may also obtain height information on the plurality of points from a DEM for the subject area.

For example, the information collecting unit 121 may initially obtain location information and height information on a plurality of points in the subject area 21 and then generate a DEM for the subject area 21 based on the obtained information. Then, the information collecting unit 121 may obtain height information on other points in the subject area 21 from the DEM.

According to an embodiment, a plurality of points in the subject area 21 may be located at regular intervals but in some embodiments, the plurality of points may be arranged at different intervals. In other words, the plurality of points may be distributed in the subject area 21 uniformly or non-uniformly.

The target area setting unit 123 may use height information collected from the subject area 21 to newly set a target area.

Figure 11:
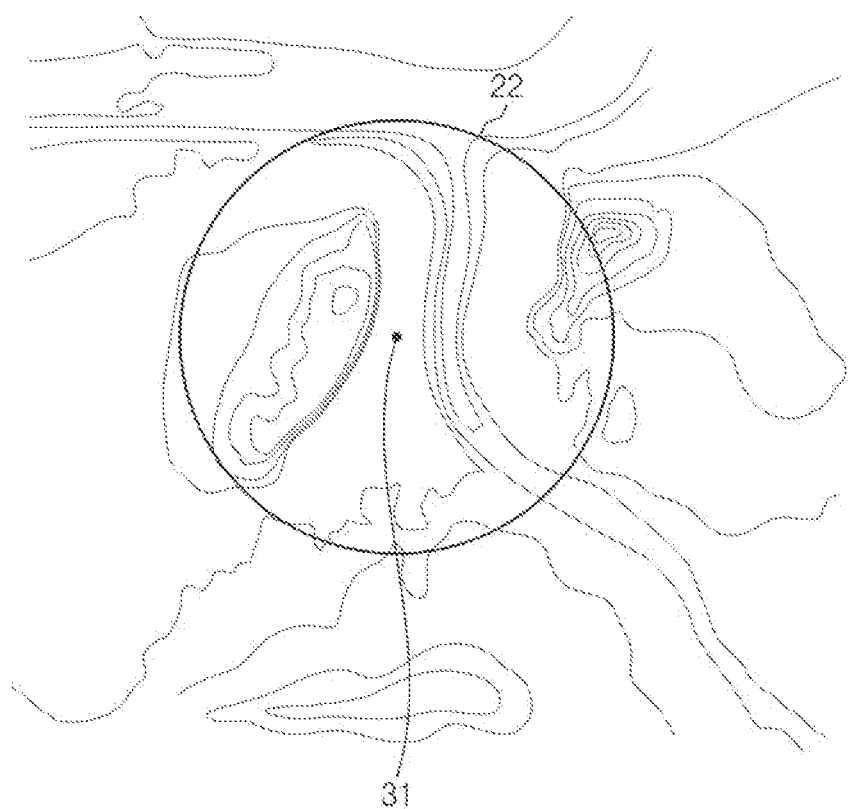
FIG. 11 is an example of a target area set for calculating wind load according to an embodiment of the present invention.

FIG. 11 is an example of a target area set for calculating wind load according to an embodiment of the present invention.

According to an embodiment, as shown in FIG. 11, the target area setting unit 123 may set, as the target area 22, a circle-shaped area having, as a radius, a length obtained by multiplying a height difference between the highest point and the lowest point in the subject area 21 by a preset value around a structure 31.

In this example, a size of the target area 22 may be smaller than that of the subject area 21. However, depending on the height difference between the highest point and the lowest point in the subject area 21 or the value to multiply by the height difference, the size of the target area 22 may be larger than that of the subject area 21.

As an example, the value to multiply by the height difference to find a radius of the target area 22 may be set to 1.6 but the value to multiply is not limited thereto and may be set to various values depending on the embodiment.

Figure 12:
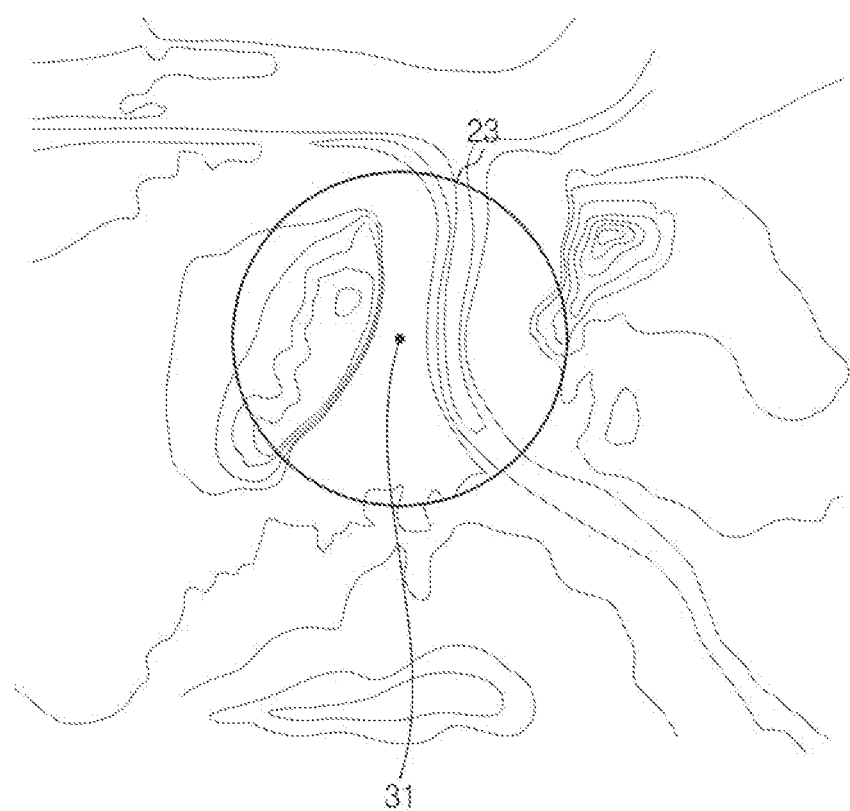
FIG. 12 is an example of a target area set for calculating wind load according to another embodiment of the present invention.

FIG. 12 is an example of a target area set according to another embodiment of the present invention.

According to another embodiment, the target area setting unit 123 may first set, as a first area (e.g., target area 22 of FIG. 11), a circle-shaped area having, as a radius, a length obtained by multiplying a height difference between the highest point and the lowest point in the subject area 21 by a preset value around a structure 31.

Then, as shown in FIG. 12, the target area setting unit 123 may set, as a target area 23, a circle-shaped area having, as a radius, a length obtained by multiplying a height difference between the highest point in the first area 22 and the lowest point in the subject area 21 by a preset value around the structure 31.

Likewise, the value to multiply by the height difference to find a radius of the target area 23 may be set to 1.6 but the value to multiply is not limited thereto and may be set to various values depending on the embodiment.

The peak height estimating unit 113 may find a peak height from the target area 22 or 23, find the height of the ground surface from the subject area 21 and then subtract the height of the ground surface from the peak height to estimate a peak height used for calculating wind load.

According to an embodiment, the peak height estimating unit 113 may determine the highest point in the target area 22 or 23 as a peak.

According to an embodiment, the peak height calculating unit 113 may determine, as the ground surface, the lowest of a plurality of points in the subject area 21.

According to another embodiment, the peak height estimating unit 113 may determine, as the ground surface, a point having a height corresponding to the mode among a plurality of points in the subject area 21.

According to another embodiment, the peak height estimating unit 113 may determine, as the ground surface, a point having a height corresponding to the rank value of a rank having the maximum frequency on a frequency distribution of the heights of a plurality of points in the subject area 21.

According to another embodiment, the peak height estimating unit 113 may determine, as the ground surface, a point having a height corresponding to the rank value of a rank having the minimum frequency on a frequency distribution of the heights of a plurality of points in the subject area 21.

In this example, a height used for determining the ground surface may be an elevation value of a corresponding point.

According to another embodiment of the present embodiment, the peak height estimating unit 122 may also subtract the height of the ground surface of the target area 22 or 23 from the peak height of the target area 22 or 23 to estimate a peak height. Unlike the above description, the height of the ground surface used for the peak height estimation in the present embodiment is collected from the target area 22 or 23 not the subject area 21.

According to the present embodiment, the target area setting unit 123 may set, as the target area 22, a circle-shaped area having, as a radius, a length obtained by multiplying a height difference between the highest point and the lowest point in the subject area 21 by a preset value around the structure 31.

In some embodiments, the target area setting unit 123 may also set, as a first area 22, a circle-shaped area having, as a radius, a length obtained by multiplying a height difference between the highest point and the lowest point in the subject area 21 by a preset value around the structure 31, and set, as a target area 23, a circle-shaped area having, as a radius, a length obtained by multiplying a height difference between the highest point and the lowest point in the first area 21 by a preset value around the structure 31.

Moreover, according to the present embodiment, the peak height estimating unit 122 may determine the highest point in the target area 22 or 23 as a peak and determine the lowest point in the target area 22 or 23 as the ground surface.

In some embodiments, the peak height estimating unit 122 may also determine, as the ground surface, a point having a height corresponding to the mode among a plurality of points in the target area 22 or 23, a point having a height corresponding to the rank value of a rank having the maximum frequency on a frequency distribution of the heights of a plurality of points in the target area 22 or 23, or a point having a height corresponding to the rank value of a rank having the minimum frequency on a frequency distribution for the heights of a plurality of points in the target area 22 or 23.

According to another embodiment of the present invention, the information collecting unit 121 may further collect location information on a plurality of points in the subject area 21 in addition to height information thereon. In this case, the target area setting unit 123 may use the location information to set a target area different from the subject area 21.

That is, in the present embodiment, the target area may be set based on location information on a plurality of points in the subject area 21 not height information thereon.

According to the present embodiment, the target area setting unit 123 may set, as a target area 22, a circle-shaped area having, as a radius, a length obtained by multiplying the horizontal distance between the highest point and the lowest point in the subject area 21 by a preset value around a structure 31.

In some embodiments, the target area setting unit 123 may also set, as a first area 22, a circle-shaped area having, as a radius, a length obtained by multiplying the horizontal distance between the highest point and the lowest point in the subject area 21 by a preset value around the structure 31, and set, as a target area 23, a circle-shaped area having, as a radius, a length obtained by multiplying the horizontal distance between the highest point and the lowest point in the first area 22 by a preset value around the structure 31.

As an example, the value to multiply by the horizontal distance to find a radius of the target area 22 or 23 may be set to 0.75 but the value to multiply is not limited thereto and may be set to various values depending on the embodiment.

In this case, when the number of the highest points in the subject area 21 or the first are 22 is two or more or the number of the lowest points is two or more, the target area setting unit 123 may use the shortest of a plurality of horizontal distances connecting the highest points to the lowest points respectively to set a target area.

For example, when the number of the highest points in the subject area 21 is one but the number of the lowest points is two, the number of the horizontal distances between the highest point and the lowest points is two. In this case, the target area setting unit 123 may select the shortest of the two horizontal distances to use it for setting a target area.

According to another embodiment of the present embodiment, the peak height estimating unit 122 may subtract the height of the ground surface located on a line that passes through the peak of the target area 22 or 23 and a structure, from the peak height of the target area 22 or 23 to estimate the peak height.

Figure 13:
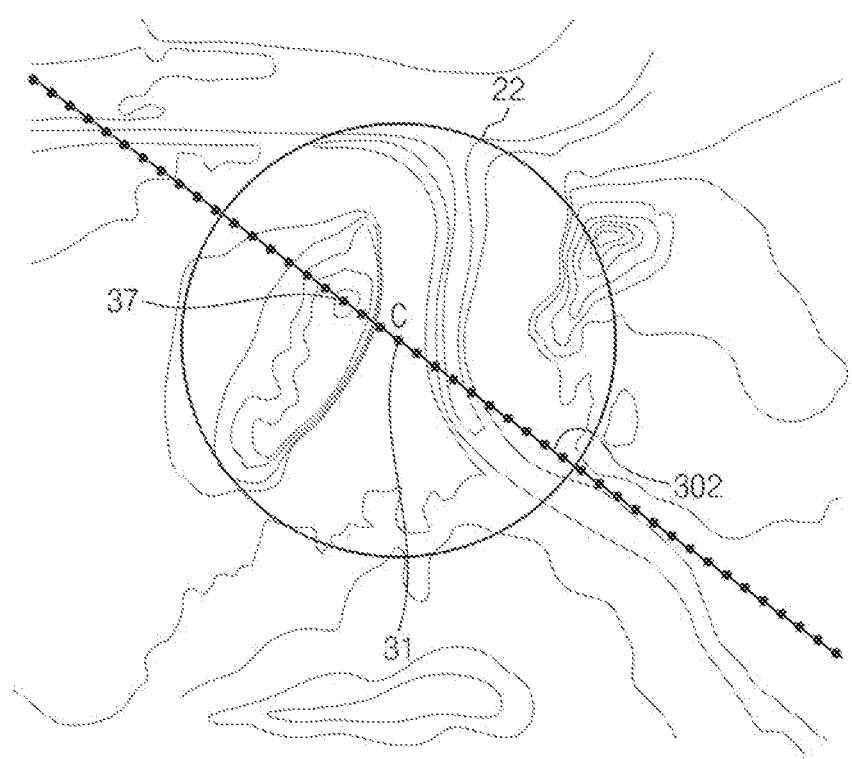
FIG. 13 is an exemplary diagram for explaining a process of estimating a peak height according to another embodiment of the present invention.
Figure 14:
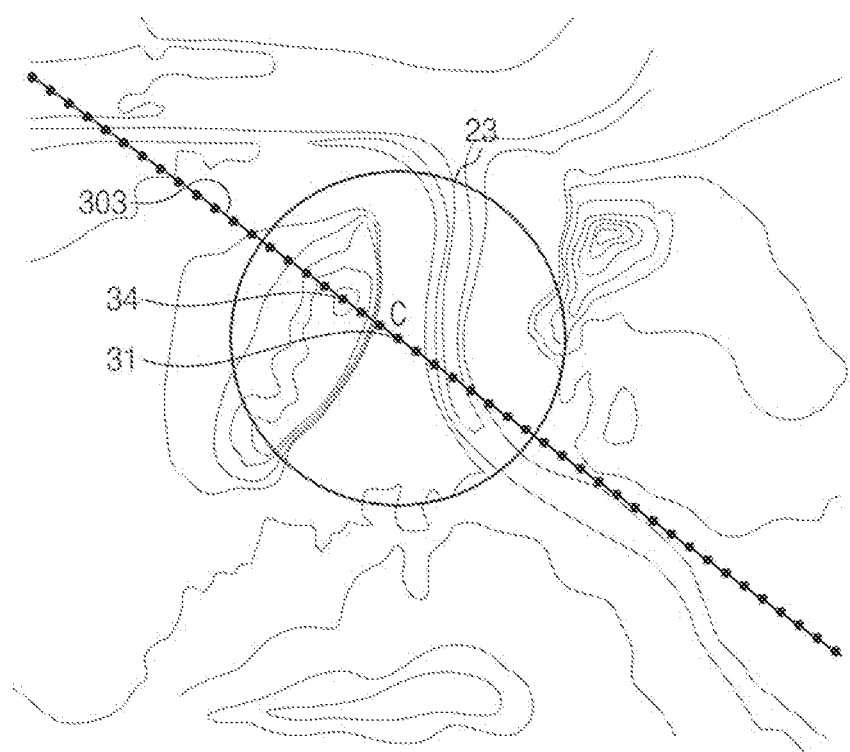
FIG. 14 is an exemplary diagram for explaining a process of estimating a peak height according to another embodiment of the present invention.

FIGS. 13 and 14 are exemplary diagrams for explaining a process of estimating a peak height according to another embodiment of the present invention.

Referring to FIGS. 13 and 14, the peak height estimating unit 122 may determine the highest point in the target area 22 or 23 as a peak. In addition, the peak height estimating unit 122 may determine the lowest of a plurality of points located on a line 302 or 303 that passes through the highest point in the target area 22 or 23 and the structure 31, as the ground surface.

In some embodiments, the peak height estimating unit 122 may determine, as the ground surface, a point having a height corresponding to the mode among a plurality of points located on a line 302 or 303 that passes through the highest point in the target area 22 or 23 and the structure 31.

In some embodiments, the peak height estimating unit 122 may determine, as the ground surface, a point having a height corresponding to the rank value of a rank, which has the maximum frequency on a frequency distribution of the heights of a plurality of points located on a line 302 or 303, which passes through the highest point in the target area 22 or 23 and the structure 31.

In some embodiments, the peak height estimating unit 122 may determine, as the ground surface, a point having a height corresponding to the rank value of a rank, which has the minimum frequency on a frequency distribution of the heights of a plurality of points located on a line 302 or 303, which passes through the highest point in the target area 22 or 23 and the structure 31.

According to another embodiment of the present invention, instead of collecting height information on a plurality of points over the subject area 21 or the target area 22 or 23, the information collecting unit 121 may obtain height information on a plurality of points located on a line that passes through the lowest point in the subject area 21 or the target area 22 or 23 and the structure 31.

Figure 15:
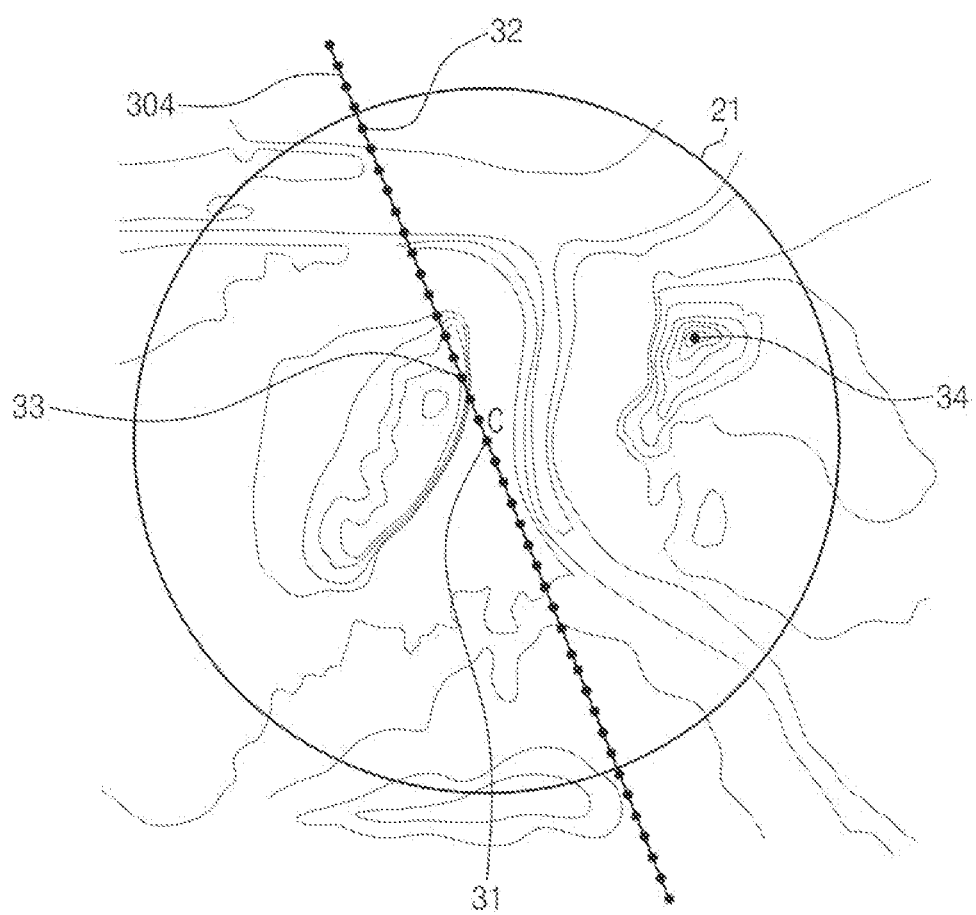
FIG. 15 is an exemplary diagram for explaining a process of estimating a peak height according to another embodiment of the present invention.
Figure 16:
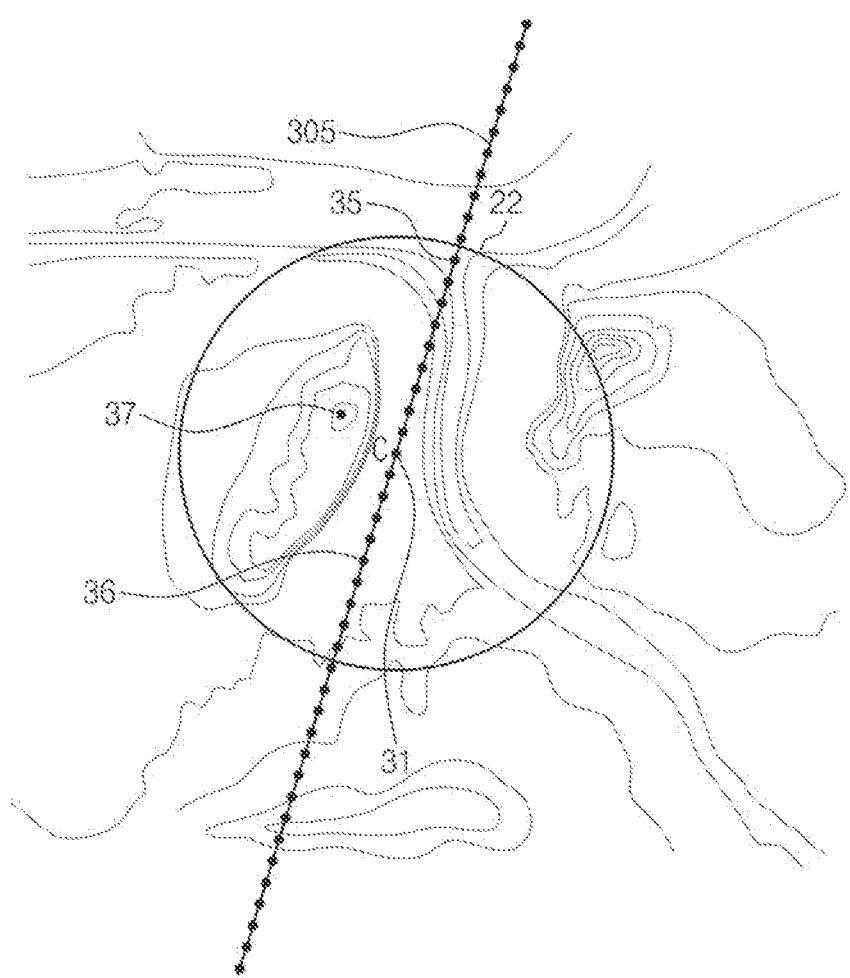
FIG. 16 is an exemplary diagram for explaining a process of estimating a peak height according to another embodiment of the present invention.
Figure 17:
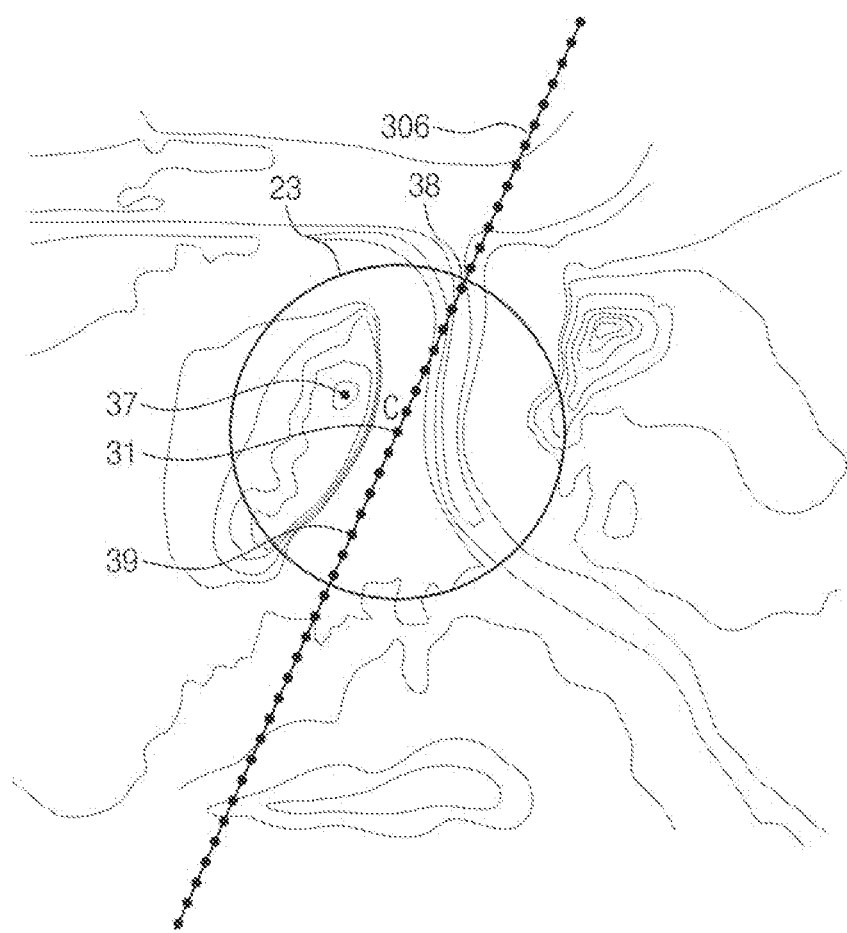
FIG. 17 is an exemplary diagram for explaining a process of estimating a peak height according to another embodiment of the present invention.

FIGS. 15 to 17 are exemplary diagrams for explaining a process of estimating a peak height according to another embodiment of the present invention.

Referring to FIGS. 15 to 17, the information collecting unit 121 may obtain height information on a plurality of points located on a line 304, 305 or 306 that passes through the lowest point in the subject area 21 or the target area 22 or 23 and the structure 31.

The plurality of points may be arranged at regular intervals on the line 304, 305 or 306 but in some embodiments, the plurality of points may be arranged at different intervals. In other words, the plurality of points may be distributed on the line uniformly or non-uniformly.

According to the present embodiment, the peak height estimating unit 122 may subtract the height of the lowest point 32, 35 or 38 in the target area 22 or 23, from the height of the highest 33, 36 or 39 of the plurality of points located on the line 304, 305 or 306 to estimate the peak height.

According to an embodiment of the present invention, the peak height estimating unit 122 may obtain height information on a plurality of points located on a line passing through the highest point in the target area 22 or 23 and the structure 31, by using interpolation based on at least one of: a digital map including location and height information on a plurality of points in the subject area 21; and survey data obtained by surveying a plurality of points in the subject area 21.

Then, the peak height estimating unit 122 may determine the highest point in the target area 22 or 23 as a peak, and determine the lowest of a plurality of points located on the line as the ground surface.

In some embodiments, the peak height estimating device 100 may also further estimate other parameters used for computing wind load in addition to a peak height H. For example, the parameters may include at least one of the horizontal distance $L_u$ of a windward side, the vertical distance $H_d$ of a leeward side and f a structure and peak horizontal distance x.

Figure 18:
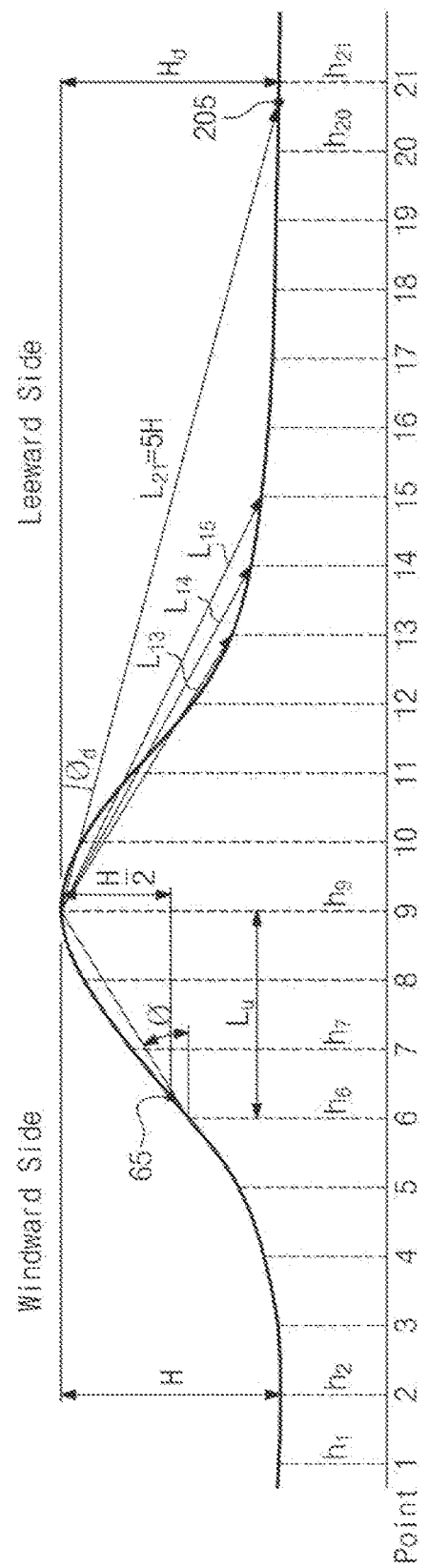
FIG. 18 is a sectional view of the windward side and leeward side of a topography exemplarily shown to explain a parameter computation process according to an embodiment of the present invention.

FIG. 18 is a sectional view of the windward side and leeward side of a topography exemplarily shown to explain a parameter computation process according to an embodiment of the present invention.

According to an embodiment, the peak height estimating device 100 may determine the highest point (point 9) in the subject area as a peak.

According to an embodiment, the peak height estimating unit 100 may determine the lowest (point 2) of a plurality of points as the ground surface. In some embodiments, the peak height estimating device 100 may determine, as the ground surface, a point having a height corresponding to the mode among a plurality of points; a point having a height corresponding to the rank value of a rank having the maximum frequency on a frequency distribution of the heights of a plurality of points; or a point having a height corresponding to the rank value of a rank having the minimum frequency on a frequency distribution for the heights of a plurality of points.

According to an embodiment, the peak height estimating device 100 may compute a height difference between the height of the peak (point 9) and the height of the ground surface (point 2) to estimate a peak height H. For example, when the height $h_9$ of the peak (point 9) is 40 m and the height $h_2$ of the ground surface (point 2) is 10 m, the peak height estimating device 100 may estimate $h_9-h_2=30$ m as the peak height H.

According to an embodiment of the present invention, the peak height estimating device 100 may compute the difference between the height of the peak and the height of each of points located on a windward side slope. For example, referring to FIG. 18, the peak height estimating device 100 may compute the height difference $h_9-h_1$, $h_9-h_2$, $h_9-h_3$, $h_9-h_4$, $h_9-h_5$, $h_9-h_6$, $h_9-h_7$, or $h_9-h_8$ between the peak (point 9) and each of points (point 1 to point 8) located on a windward side slope.

Then, the peak height estimating unit 100 may determine at which point the computed height difference is closest to the half of the difference (i.e. peak height H) between the height of a peak and the height of the ground surface. Referring to FIG. 18, a point at which the height difference relative to the peak (point 9) is closest to the half of a peak height, H/2 is point 6.

Then, the peak height estimating device 100 may compute the horizontal distance between the determined point and the peak to estimate the horizontal distance $L_u$ of a windward side. For example, referring to FIG. 18, the peak height estimating device 100 may compute the horizontal distance between point 6 and point 9 being the peak to estimate the horizontal distance $L_u$ of a windward side.

In some embodiments, when the points are spaced at regular intervals, it is possible to estimate the horizontal distance $L_u$ of a windward side by computing the multiple of the interval. For example, when the interval between points in FIG. 2 is set to 10 m, the peak height estimating device 100 may estimate $10 \times (9-6) = 30$ m as the horizontal distance $L_u$ of a windward side.

According to another embodiment of the present invention, the peak height calculating device 100 may determine a point having a height difference of H/2 by using interpolation.

According to the present embodiment, the peak height estimating device 100 may compute the difference between the height of a peak and the height of each of points located on a windward side slope. Then, the peak height estimating unit 100 may determine a first point at which the height difference is closest to the half of the difference between the height of a peak and the height of the ground surface, H/2 and a second point at which the height difference is second closest thereto. For example, referring to FIG. 18, the first point at which the height difference is closest to H/2 is point 6 and the second point at which the height difference is second closest to H/2 is point 7.

Then, the peak height estimating unit 100 may estimate a point at which the height difference relative to the peak is the half of the difference between the height of the peak and the height of the ground surface, H/2, by using interpolation from the first point and the second point.

Figure 19:
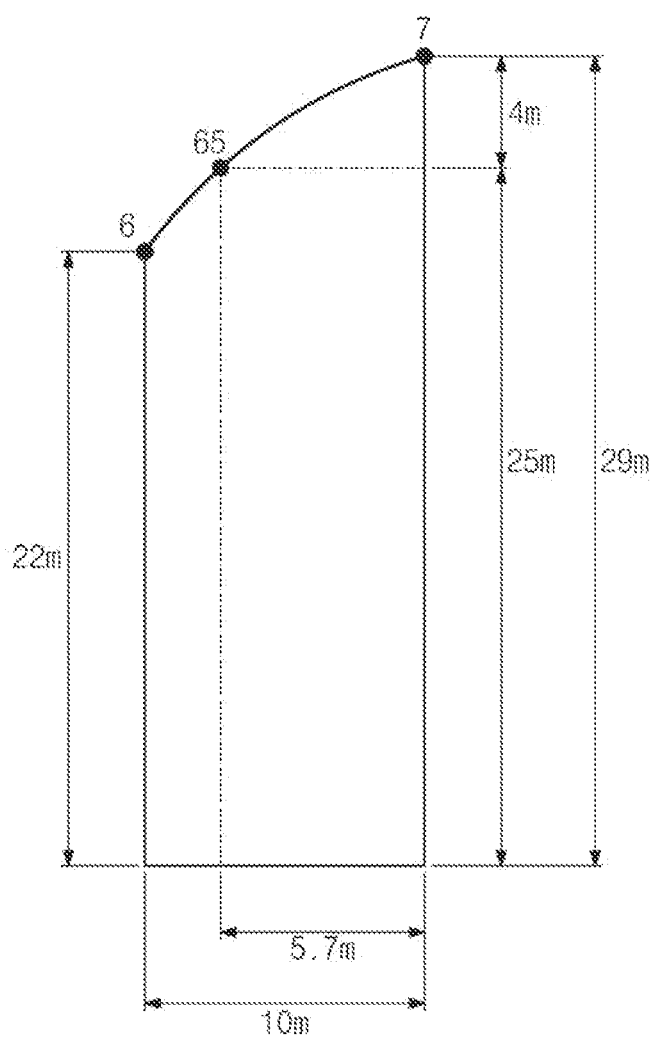
FIG. 19 is a diagram for explaining a process of computing the horizontal distance of the windward side of a topography by using interpolation according to an embodiment of the present invention.

FIG. 19 is a diagram for explaining a process of computing the horizontal distance of a windward side of a topography by using interpolation according to an embodiment of the present invention;

As shown in FIG. 19, the peak height estimating device 100 may estimate point 65 at which the height difference relative to a peak (point 9) is H/2, by using interpolation from a first point (point 6) and a second point (point 7). For example, when the height of the first point (point 6) is 22 m, the height of the second point (point 7) is 29 m, the height of a peak (point 9) is 40 m, the height of the ground surface (point 2) is 10 m, and the horizontal distance between the first point (point 6) and the second point (point 7) is 10 m, the height of point 65 at which the height difference relative to the peak (point 9) is $H/2=(h_9-h_2)/2=15$ m is 25 m. According to an embodiment, when linear interpolation is performed by using a linear function, the horizontal distance between point 65 and point 7 is computed as $10 \times (h_9-h_2)/(h_9-h_2) = 10 \times (29-25)/(29-22) \approx 5.7$ m.

Then, the peak height estimating device 100 may compute the horizontal distance between point 65 and the peak (point 9) to estimate the horizontal distance $L_u$ of a windward side. For example, since the horizontal distance between point 65 and point 7 is 5.7 m and the horizontal distance between point 7 and point 9 is $10 \times (9-7) = 20$ m, the peak height estimating device 100 may estimate 25.7 m as the horizontal distance $L_u$ of the windward side of the topography.

As described above, the peak height estimating device 100 may use at least one of location information and height information on a plurality of points to estimate the horizontal distance $L_u$ of the windward side of the topography. According to an embodiment of the present invention, the peak height estimating device 100 may also use at least one of the location information and height information to estimate the vertical distance $H_d$ of the leeward side of a topography.

According to an embodiment, the peak height estimating device 100 may compute the straight distance between a peak and each of points located on a leeward side slope. For example, referring to FIG. 18, the peak height estimating device 100 may compute the straight distance L between a peak (point 9) and each of points (points 10 to 21) located on a leeward side slope.

Then, the peak height estimating unit 100 may determine at which point the straight distance is closest to five times the difference between the height of a peak and the height of the ground surface. Referring to FIG. 18, a point at which the straight distance relative to the peak (point 9) is closest to five times a peak height, 5 H is point 21.

Then, the peak height estimating device 100 may compute the distance between the height of the determined point and the height of the peak to estimate the vertical distance $H_d$ of a leeward side. Referring to FIG. 18, the peak height estimating device 100 may find the height distance between point 21 and the peak (point 9) to estimate the vertical distance $H_d$ of a windward side. For example, when the height of point 21 is 11 m, the peak height estimating device 100 may estimate $h_9-h_{21}=40-11=29$ m as the vertical distance $H_d$ of a leeward side.

According to another embodiment of the present invention, the peak height calculating device 100 may determine a point having a straight distance of 5 H by using interpolation.

According to the present embodiment, the peak height estimating device 100 may compute the straight distance L between a peak and each of points located on a leeward side slope. Then, it is possible to determine a first point at which the straight distance is closest to five times the difference between the height of the peak and the height of the ground surface, 5 H and a second point at which the straight distance is second closest thereto. For example, referring to FIG. 18, the first point at which the straight distance is closest to 5 H is point 21 and the second point at which the straight distance is second closest to 5 H is point 20.

Then, the peak height estimating unit 100 may estimate a point at which the straight distance L relative to the peak is five times the difference between the height of the peak and the height of the ground surface, 5 H by using interpolation from the first point and the second point.

Figure 20:
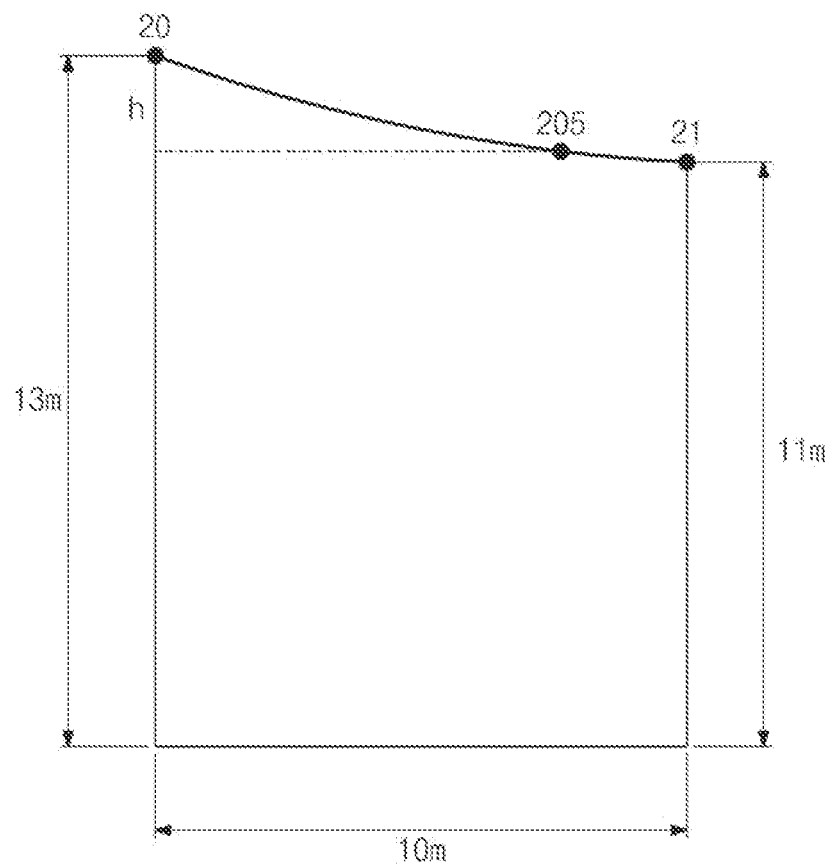
FIG. 20 is a diagram for explaining a process of computing the vertical distance of the leeward side of a topography by using interpolation according to an embodiment of the present invention.

FIG. 20 is a diagram for explaining a process of computing the vertical distance of the leeward side of a topography by using interpolation according to an embodiment of the present invention.

As shown in FIG. 20, the peak height estimating device 100 may estimate point 205 at which the straight distance relative to a peak (point 9) is 5 H, by using interpolation from a first point (point 21) and a second point (point 20). For example, when the height of the first point (point 21) is 11 m, the height of the second point (point 20) is 13 m, the height of the peak (point 9) is 40 m, the height of the ground surface (point 2) is 10 m, the horizontal distance between the first point (point 21) and the second point (point 20) is 10 m, the straight distance L21 between the peak (point 9) and the first point (point 21) is 152 m, and the straight distance L20 between the peak (point 9) and the second point (point 22) is 146 m, the peak height estimating device 100 may find the height difference h between the point 20 and the point 205 as follows:

$$h=(L205-L20)/(L21-L20)\times(h20-h21)=(150-146)/(152-146)\times(13-11)\approx 1.3 \text{ m}.$$

Then, the peak height estimating device 100 may compute the vertical distance between point 205 and the peak (point 9) to estimate the vertical distance $H_a$ of a leeward side. As described above, since the vertical distance between point 20 and point 205 is 1.3 m and the vertical distance between point 9 and point 20 is $h_9-h_{20}=40-13=27$ m, the peak height estimating device 100 may estimate 28.3 m as the vertical distance $H_a$ of the windward side of the topography.

According to an embodiment of the present invention, the peak height calculating device 100 may compute the horizontal distance between the peak and a point closest to a structure to estimate a structure and peak horizontal-distance x. For example, when a point closest to a structure in FIG. 18 is point 18, the peak height estimating device 100 may estimate $10\times(18-9)=90$ m as a structure and peak horizontal-distance x. In some embodiments, when the structure is located between two points, the peak height estimating device 100 may also estimate the structure and peak horizontal-distance x by using interpolation from the two points.

Referring back to FIGS. 1 and 9, the peak height estimating device 100 may further include a wind speedup factor calculating unit 124. The wind speedup factor calculating unit 124 may compute a wind speedup factor based on the estimated values H, $L_u$, $H_d$, and x, and the height z from the ground surface to compute a design wind speed.

The target area setting unit 120, the information collecting unit 121, the peak height estimating unit 122 and the wind speedup factor calculating unit 124 that are described above may be configured as a processor, such as CPU that executes a program for estimating a peak height and performs a peak height estimating operation. Also, the program for estimating the peak height may be stored in a storage unit 13, and the peak height estimating device 100 may call and execute the program from the storage unit 13.

According to an embodiment of the present invention, the peak height estimating device 100 may further include an output unit 15. The output unit 15 may output a peak height estimated according to an embodiment of the present invention and provide it to a user. According to an embodiment, the output unit 15 may include a display, such as a liquid crystal display (LCD) or a plasma display panel (PDP) that visually displays certain information.

Figure 21:
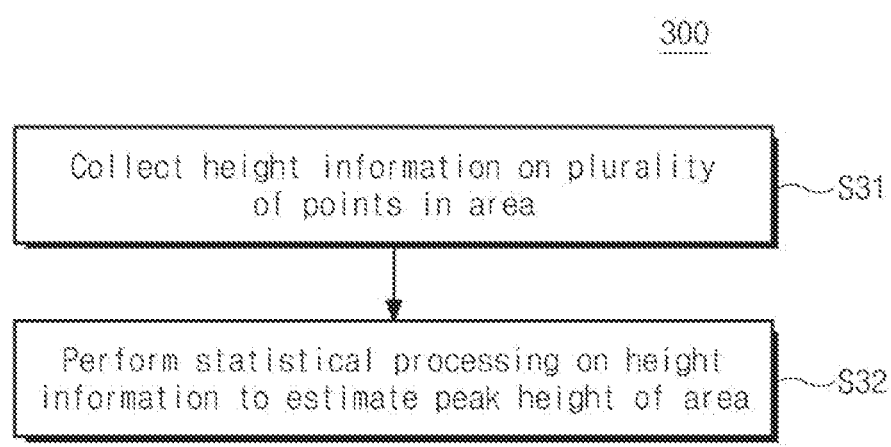
FIG. 21 is an exemplary flow chart of a peak height estimating method according to an embodiment of the present invention.

FIG. 21 is an exemplary flow chart of a peak height estimating method according to an embodiment of the present invention.

The peak height estimating method according to an embodiment of the present invention may be performed by the peak height estimating device 100 as described above.

As shown in FIG. 21, a peak height estimating method 300 according to an embodiment of the present invention may include collecting height information on a plurality of points in a subject area in step S31 and performing statistical processing on the height information to estimate a peak height in step S32.

According to another embodiment of the present invention, the collecting of the height information in step S31 may include reading height information on a subject area 21 from a storage unit 13.

According to another embodiment of the present invention, the collecting of the height information in step S31 may include connecting to a server 200 providing geographical information on the subject area 21 and receiving the height information from the server 200. In other words, height information on a plurality of points x in the subject area 21 may also be provided from the server 200 providing geographical information, such as GIS through a wired or wireless network.

The geographical information on the subject area may include at least one of a digital map of the subject area, a DEM of the subject area, and survey data obtained by surveying the subject area but is not limited thereto. The survey data may be obtained by using at least one of ground survey, GPS survey, aerial photogrammetry, radar survey, and LiDAR survey but a survey method for surveying the subject area is not limited thereto According to another embodiment, the estimating of the peak height in step S32 may include calculating a maximum value of the heights of a points, calculating a frequency distribution of the heights of the plurality of points, calculating the rank value of a rank having the maximum frequency on the frequency distribution, and subtracting the rank value from the maximum value. In the present embodiment, the height of a point corresponding to the ground surface of a subject area may correspond to the rank value of a rank having the maximum frequency on a frequency distribution.

According to another embodiment, the estimating of the peak height in step S32 may include calculating a maximum value of the heights of a points, calculating a frequency distribution of the heights of the plurality of points, calculating the mean value of heights belonging to a rank having the maximum frequency on the frequency distribution, and subtracting the mean value from the maximum value. In this example, the mean value may be one of the arithmetic mean, the geometric mean, and the harmonic mean, and may also be a weighted average value obtained by applying a frequency as a weighted value to a height.

According to another embodiment, in stead of estimating a peak height based on a rank having the maximum frequency on a frequency distribution, the estimating of the peak height in step S32 may also estimate a peak height based on a rank having the minimum frequency.

For example, the estimating of the peak height in step S32 may include calculating a maximum value of the heights of a plurality of points, calculating a frequency distribution of the heights of the plurality of points, calculating the rank value of a rank having the maximum frequency on the frequency distribution, and subtracting the rank value from the maximum value.

As another example, the estimating of the peak height in step S32 may include calculating a maximum value of the heights of a plurality of points, calculating a frequency distribution of the heights of the plurality of points, calculating the mean value of heights belonging to a rank having the minimum frequency on the frequency distribution, and subtracting the mean value from the maximum value. The mean value may be one of the arithmetic mean, the geometric mean, and the harmonic mean, and may also be a weighted average value obtained by applying a frequency as a weighted value to a height.

According to another embodiment of the present invention, the collecting of the height information on the points in step S31 may further include collecting location information on a plurality of points in a subject area. In addition, estimating the peak height in step S32 may include using regression analysis based on the location information and the height information to calculate a regression equation, and using the height information and the regression equation to estimate the peak height.

According to the present invention, calculating the regression equation may include calculating the regression equation based on location and height information on some of the plurality of points.

As an example, calculating the regression equation may include calculating the regression equation based on location and height information on a predetermined number of points or a predetermined percentage of points among the plurality of points.

As another example, calculating the regression equation may include calculating a frequency distribution for the heights of the plurality of points, selecting a point having a height belonging to a rank having the maximum frequency or the minimum frequency on the frequency distribution, and calculating the regression equation based on location information and height information on the selected point.

In this example, the location information (x, y) may be set to an independent variable for a regression equation and the height information (z) may be set to a dependent variable.

Estimating the peak height in step S32 may include selecting the highest of a plurality of points, and subtract a height obtained by applying location information on the highest point to the regression equation from the height of the highest point to estimate the peak height.

According to another embodiment of the present invention, after collecting the height information in step S31, the peak height estimating method 300 may further include using the height information by the target area setting unit 123 to set a target area 22 or 23 different from a subject area 21.

In this case, estimating the peak height in step S32 may include subtracting the height of the ground surface of the subject area 21 from the height of the peak of the target area 22 or 23 to estimate the peak height.

As an example, setting the target area may include setting, as the target area 22, a circle-shaped area having, as a radius, a length obtained by multiplying a height difference between the highest point and the lowest point in the subject area 21 by a preset value around the structure.

As another example, setting the target area may include setting, as a first area 22, a circle-shaped area having, as a radius, a length obtained by multiplying a height difference between the highest point and the lowest point in the subject area 21 by a preset value around the structure 31, and setting, as a target area 23, a circle-shaped area having, as a radius, a length obtained by multiplying a height difference between the highest point in the first area 22 and the lowest point in the subject area 21 by a preset value around the structure 31.

In this case, estimating the peak height in step S32 may include determining the highest point in the target area 22 or 23 as a peak and determining, as the ground surface, the lowest of a plurality of points in the subject area 21.

In some embodiments, the ground surface may also be determined as a point having a height corresponding to the mode among a plurality of points in the subject area 21, a point having a height corresponding to the rank value of a rank having the maximum frequency on a frequency distribution for the heights of a plurality of points in the subject area 21, or a point having a height corresponding to the rank value of a rank having the minimum frequency on a frequency distribution for the heights of a plurality of points in the subject area 21.

According to another embodiment, the height of the ground surface may be determined from a plurality of points in the target area 22 or 23 not the subject area 21.

For example, the ground surface may also be determined as the lowest point in the target area 22 or 23, a point having a height corresponding to the mode among a plurality of points in the target area 22 or 23, a point having a height corresponding to the rank value of a rank having the maximum frequency on a frequency distribution for the heights of a plurality of points in the target area 22 or 23, or a point having a height corresponding to the rank value of a rank having the minimum frequency on a frequency distribution for the heights of a plurality of points in the target area 22 or 23.

According to another embodiment, setting the target area may be set based on location information on a plurality of points in the subject area 21, not height information thereon.

As an example, setting the target area may include setting, as a target area 22, a circle-shaped area having, as a radius, a length obtained by multiplying the horizontal distance between the highest point and the lowest point in the subject area 21 by a preset value around the structure 31.

As another example, setting the target area may include setting, as a first area 22, a circle-shaped area having, as a radius, a length obtained by multiplying the horizontal distance between the highest point and the lowest point in the subject area 21 by a preset value around the structure 31, and setting, as a target area 23, a circle-shaped area having, as a radius, a length obtained by multiplying the horizontal distance between the highest point in the first area 22 and the lowest point in the subject area 21 by a preset value around the structure 31.

In some embodiments, when the number of the highest points in the subject area 21 or the first are 22 is two or more or the number of the lowest points is two or more, the horizontal distance used for setting the target area may be the shortest of a plurality of horizontal distances connecting the highest points to the lowest points respectively.

According to another embodiment, estimating the peak height in step S32 may include subtracting the height of the ground surface located on a line passing through the peak of the target area 22 or 23 and the structure 31, from the height of the peak of the target area 22 or 23 to estimate the peak height.

In the present embodiment, estimating the peak height may include determining the highest point in the target area 22 or 23 as a peak, and determining, as the ground, the lowest of a plurality of points located on a line 302 or 303 that passes through the highest point in the target area 22 or 23 and the structure 31.

In some embodiments, the ground surface may also be determined as a point having a height corresponding to the mode among a plurality of points located on a line 302 or 303 passing through the highest point in the target area 22 or 23 and the structure 31, a point having a height corresponding to the rank value of a rank having the maximum frequency on a frequency distribution for the heights of a plurality of points located on a line 302 or 303 passing through the highest point in the target area 22 or 23 and the structure 31, or a point having a height corresponding to the rank value of a rank having the minimum frequency on a frequency distribution for the heights of a plurality of points located on a line 302 or 303 passing through the highest point in the target area 22 or 23 and the structure 31.

According to another embodiment, collecting the height information in step S31 may include collecting height information on a plurality of points located on a line passing through the lowest point in the subject area and the structure 31.

In this case, estimating the peak height in step S32 may include subtracting the height of the lowest point in the subject area from the height of the highest of the plurality of points to estimate the peak height.

According to another embodiment of the present invention, the peak height estimating method 300 may further include estimating other parameters used for computing wind load in addition to a peak height H. In this example, the parameters may include at least one of the horizontal distance $L_u$ of a windward side, the vertical distance $H_d$ of a leeward side and a structure and peak horizontal-distance x.

According to an embodiment of the present invention, estimating the parameter may include determining the highest point in the subject area as a peak, and determining, as the ground surface, the lowest of a plurality of points located on the line.

In some embodiments, the ground surface may also be determined as a point having a height corresponding to the mode among a plurality of points located on the line; a point having a height corresponding to the rank value of a rank having the maximum frequency on a frequency distribution for the heights of a plurality of points located on the line; or a point having a height corresponding to the rank value of a rank having the minimum frequency on a frequency distribution for the heights of a plurality of points located on the line.

According to an embodiment of the present invention, estimating the parameter may include computing the difference between the height of the peak and the height of the ground surface to estimate a peak height H.

Moreover, according to an embodiment, estimating the parameter may include computing the difference between the height of a peak and the height of each of points located on a windward side slope, determining at which point the height difference is closest to the half of the difference between the height of the peak and the height of the ground surface, H/2, and computing the horizontal distance between the determined point and the peak to estimate the horizontal distance of a windward side.

According to another embodiment, estimating the parameter may also estimate the horizontal distance of a windward side by using interpolation. For example, estimating the parameter may include computing the difference between the height of a peak and the height of each of points located on a windward side slope, determining a first point at which the height difference is closest to the half of the difference between the height of the peak and the height of the ground surface, H/2, and a second point at which the height difference is second closest thereto, estimating a point at which the height difference relative to the peak is H/2, by using interpolation from the first point and the second point, and computing the horizontal distance between the estimated point and the peak to estimate the horizontal distance $L_u$ of a windward side.

According to an embodiment, estimating the parameter may estimate the vertical distance $H_d$ of a leeward side from location information and height information on a plurality of points. For example, estimating the parameter may include computing the straight distance between a peak and each of a plurality of points located on a leeward side slope, determining a point at which the straight distance closest to five times the difference between the height of a peak and the height of the ground surface, 5 H, and computing the height difference between the determined point and a peak to estimate the vertical distance $H_d$ of a leeward side.

According to another embodiment, estimating the parameter may also estimate the vertical distance $H_d$ of a leeward side by using interpolation. For example, estimating the parameter may include computing the straight distance between a peak and each of points located on a leeward side slope, determining a first point at which the straight distance is closest to five times the difference between the height of the peak and the height of the ground surface, 5 H, and a second point at which the straight distance is second closest thereto, estimating a point at which the straight distance relative to the peak is 5 H, by using interpolation from the first point and the second point, and computing the straight distance between the estimated point and the peak to estimate the vertical distance $L_u$ of a leeward side.

According to an embodiment, estimating the parameter may include computing the horizontal distance between a peak and a point closes to a structure to estimate a structure and peak horizontal distance x.

According to an embodiment of the present invention, the peak height estimating method 300 may further include calculating a wind speedup factor of a topography based on the calculated parameter.

The peak height estimating method 300 according to the embodiments of the present invention as described above may be manufactured as a program to be executed on a computer and may be stored in a computer readable recording medium. The computer readable recording medium includes all kinds of storage devices that store data capable of being read by a computer system.

Examples of the computer readable recording medium are a ROM, a RAM, a CD-ROM, a magnetic tape, a floppy disk, and an optical data storage device.

A device and method that collects height information on a plurality of points located in a subject area and perform statistical processing on the collected height information to estimate a peak height. According to the peak height estimating device and method, by preventing each designer from estimating different peak heights for the same region, the peak height may be estimated objectively and quantitatively and as a result, wind load may be reasonably computed.

What is claimed is:

1. A device for estimating a peak height used for computing wind load applied to a structure, the device comprising:
an information collecting unit collecting height information on a plurality of points in a subject area; and
a peak height estimating unit performing statistical processing on the height information to estimate a peak height,
wherein the information collecting unit further collects location information on a plurality of points in the subject area, and
the peak height estimating unit uses regression analysis based on the location information and the height information to calculate a regression equation and uses the location information, the height information and the regression equation to estimate a peak height.

2. The device of claim 1, wherein the peak height estimating unit is configured to calculate the regression equation based on location and height information on some of the plurality of points.

3. The device of claim 2, wherein the peak height estimating unit is configured to calculate the regression equation based on location and height information on a predetermined number of points or a predetermined percentage of points among the plurality of points.

4. The device of claim 2, wherein the peak height estimating unit is configured to:
calculate a frequency distribution for the heights of the plurality of points,
select a point having a height belonging to a rank having the maximum or minimum frequency on the frequency distribution, and
calculate the regression equation based on location and height information on the selected point.

5. The device of claim 2, wherein the peak height estimating unit is configured to set location information on said some points as an independent variable and height information on said some points as a dependent variable to calculate the regression equation.

6. The device of claim 1, wherein the peak height estimating unit is configured to:
select the highest of the plurality of points, and
subtract a height obtained by applying location information on the highest point to the regression equation, from the height of the highest point to estimate the peak height.

7. The device of claim 1, further comprising a target area setting unit that uses the height information to set a target area different from the subject area, and
wherein the peak height estimating unit subtract the height of the ground surface of the subject area from the height of a peak of the target area to estimate the peak height.

8. The device of claim 7, wherein the target area setting unit is configured to:
set, as a first area, a circle-shaped area having, as a radius, a length obtained by multiplying the height difference between the highest point and the lowest point in the subject area by a preset value around the structure; or a circle-shaped area having, as a radius, a length obtained by multiplying the height difference between the highest point and the lowest point in the subject area by a preset value around the structure, and
set, as the target area, a circle-shaped area having, as a radius, a length obtained by multiplying the height difference between the highest point in the first area and the lowest point in the subject area by a preset value around the structure.

9. The device of claim 1, wherein the information collecting unit further collects location information on a plurality of points in the subject area,
the peak height estimating device further comprises a target area setting unit that uses the location information to set a target area different from the subject area, and
the peak height estimating unit subtracts the height of the ground surface of the target area from the height of the peak of the target area to estimate the peak height.

10. The device of claim 9, wherein the target area setting unit is configured to:
set, as a first area, a circle-shaped area having, as a radius, a length obtained by multiplying the horizontal distance between the highest point and the lowest point in the subject area by a preset value around the structure; or a circle-shaped area having, as a radius, a length obtained by multiplying the horizontal distance between the highest point and the lowest point in the subject area by a preset value around the structure,
set, as the target area, a circle-shaped area having, as a radius, a length obtained by multiplying the horizontal distance between the highest point and the lowest point in the first area by a preset value around the structure.

11. The device of claim 1, further comprising a target area setting unit that uses the height information to set a target area different from the subject area, and
the peak height estimating unit subtracts the height of the ground surface located on a line passing through the peak of the target area and the structure, from the height of the peak of the target area to estimate the peak height.

12. The device of claim 1, wherein the information collecting unit further collects location information on a plurality of points in the subject area, and
the peak height estimating device further comprises a target area setting unit that uses the location information to set a target area different from the subject area, and
the peak height estimating unit subtracts the height of the ground surface located on a line passing through the peak of the target area and the structure, from the height of the peak of the target area to estimate the peak height.

13. The device of claim 11, wherein the peak height estimating unit is configured to:
determine the highest point in the target area as the peak, and
determine, as the ground surface, the lowest point of a plurality of points located on a line passing through the highest point in the target area and the structure; a point having a height corresponding to the mode among a plurality of points located on a line passing through the highest point in the target area and the structure; a point having a height corresponding to the rank value of a rank having the maximum frequency on a frequency distribution for the heights of a plurality of points located on a line passing through the highest point in the target area and the structure; or a point having a height corresponding to the rank value of a rank having the minimum frequency on a frequency distribution for the heights of a plurality of points located on a line passing through the highest point in the target area and the structure.

14. The device of claim 11, wherein the peak height estimating unit is configured to:
obtain height information on a plurality of points located on a line passing through the highest point in the target area and the structure by using interpolation based on at least one of a digital map including location and height information on a plurality of points in the subject area; and survey data obtained by surveying a plurality of points in the subject area,
determine the highest point in the target area as the peak, and
determine, as the ground surface, the lowest of a plurality of points located on the line.

15. A method of estimating a peak height used for computing wind load applied to a structure by using a peak height estimating device that comprises an information collecting unit and a peak height estimating unit, the method comprising:

collecting, by the information collecting unit, height information on a plurality of points in a subject area; and performing, by the peak height estimating unit, statistical processing on height information to estimate the peak height, wherein the information collecting unit further collects location information on a plurality of points in the subject area, and the peak height estimating unit uses regression analysis based on the location information and the height information to calculate a regression equation and uses the location information, the height information and the regression equation to estimate a peak height.

16. A non-transitory computer readable recording medium on which a program to be executed by a computer and implement a peak height estimating method is recorded, the method comprising:

collecting, by an information collecting unit, height information on a plurality of points in a subject area; and performing, by a peak height estimating unit, statistical processing on the height information to estimate the peak, wherein the information collecting unit further collects location information on a plurality of points in the subject area, and the peak height estimating unit uses regression analysis based on the location information and the height information to calculate a regression equation and uses the location information, the height information and the regression equation to estimate a peak height.

* * * * *